United States Patent
Bueno et al.

(10) Patent No.: US 11,866,849 B2
(45) Date of Patent: Jan. 9, 2024

(54) SYSTEM AND METHOD OF DOSING A POLYMER MIXTURE WITH A FIRST SOLVENT, DEVICE, SYSTEM AND METHOD OF EXTRACTING SOLVENT FROM AT LEAST ONE POLYMERIC YARN, SYSTEM AND METHOD OF MECHANICAL PRE-RECOVERY OF AT LEAST ONE LIQUID IN AT LEAST ONE POLYMERIC YARN, AND CONTINUOUS SYSTEM AND METHOD FOR PRODUCING AT LEAST ONE POLYMERIC YARN

(71) Applicant: Braskem America, Inc., Philadelphia, PA (US)

(72) Inventors: Marcos Roberto Paulino Bueno, Sao Paulo (BR); Andre Penaquioni, Sao Paulo (BR); Alessandro Bernardi, Sao Paulo (BR); Sergio Luiz Dias Almeida, Sao Paulo (BR); Leandro Ohara Oliveira Santa Rosa, Sao Paulo (BR); Patricia Freitas Oliveira Fialho, Sao Paulo (BR); Daniela Zaira Rauber, Sao Paulo (BR)

(73) Assignee: Braskem America, Inc., Philadelphia, PA (US)

( * ) Notice: Subject to any disclaimer, the term of this patent is extended or adjusted under 35 U.S.C. 154(b) by 0 days.

(21) Appl. No.: 16/824,775

(22) Filed: Mar. 20, 2020

(65) Prior Publication Data
US 2020/0283929 A1    Sep. 10, 2020

Related U.S. Application Data

(62) Division of application No. 15/032,826, filed as application No. PCT/BR2014/050004 on Oct. 29, 2014, now Pat. No. 11,124,895.

(Continued)

(51) Int. Cl.
*D01D 1/02* (2006.01)
*D01D 5/06* (2006.01)
(Continued)

(52) U.S. Cl.
CPC ............... *D01D 1/02* (2013.01); *B29B 7/007* (2013.01); *B29B 7/46* (2013.01); *B29B 7/726* (2013.01);
(Continued)

(58) Field of Classification Search
CPC .... D01F 1/00; D01F 6/00; D01D 1/02; D01D 5/06
See application file for complete search history.

(56) References Cited

U.S. PATENT DOCUMENTS 3,032,384 A * 5/1962 Riley .................. D01F 6/04
264/205
3,048,465 A * 8/1962 Jurgeleit ................. C08L 91/00
264/203

(Continued)

*Primary Examiner* — Andrew D Graham
(74) *Attorney, Agent, or Firm* — Duane Morris LLP

(57) ABSTRACT

The present invention is directed to a method and a system for the production of at least one polymeric yarn comprising means for mixing a polymer (1) with a first solvent yielding a mixture; means for homogenizing the mixture; means for rendering the mixture inert (21, 22, 23); means for dipping the mixture into a quenching bath (30), wherein an air gap is maintained before the mixture reaches the quenching bath (30) liquid surface forming at least one polymeric yarn; means for drawing (41) the at least one polymeric yarn at least once; means for washing (5) the at least one polymeric yarn with a second solvent that is more volatile than the first solvent; means for heating the at least one polymeric yarn (6); means for drawing at room temperature (7) the at least one polymeric yarn at least once; and means for heat drawing (8) the at least one polymeric yarn at least once. The instant invention also concerns a system and method of dosing a polymer mixture with a first solvent into an (Continued)

extruder (26), a device (5), a system and a method of solvent extraction from at least one polymeric yarn, and a method and system of mechanical pre-recovery (4) of at least one liquid in at least one polymeric yarn.

2 Claims, 6 Drawing Sheets

Related U.S. Application Data

(60) Provisional application No. 61/896,911, filed on Oct. 29, 2013.

(51) Int. Cl.

| | | |
|---|---|---|
| B29C 48/05 | (2019.01) | |
| B29C 48/00 | (2019.01) | |
| B29C 48/29 | (2019.01) | |
| D01D 10/06 | (2006.01) | |
| B29B 7/00 | (2006.01) | |
| B29B 7/46 | (2006.01) | |
| D01D 1/09 | (2006.01) | |
| D01F 13/00 | (2006.01) | |
| B29C 43/00 | (2006.01) | |
| D01D 13/00 | (2006.01) | |
| B29C 48/793 | (2019.01) | |
| D01D 5/16 | (2006.01) | |
| B29B 7/74 | (2006.01) | |
| D07B 1/02 | (2006.01) | |
| D01D 1/06 | (2006.01) | |
| D01D 5/088 | (2006.01) | |
| B29B 7/72 | (2006.01) | |
| B29C 48/91 | (2019.01) | |
| D01F 6/04 | (2006.01) | |
| B29C 48/88 | (2019.01) | |
| D06B 15/00 | (2006.01) | |
| B29B 7/44 | (2006.01) | |
| B29C 48/86 | (2019.01) | |

(52) U.S. Cl.
CPC .............. *B29B 7/749* (2013.01); *B29C 43/00* (2013.01); *B29C 48/0018* (2019.02); *B29C 48/05* (2019.02); *B29C 48/29* (2019.02); *B29C 48/793* (2019.02); *D01D 1/06* (2013.01); *D01D 1/09* (2013.01); *D01D 5/06* (2013.01); *D01D 5/088* (2013.01); *D01D 5/16* (2013.01); *D01D 10/06* (2013.01); *D01D 13/00* (2013.01); *D01F 13/00* (2013.01); *D07B 1/025* (2013.01); *B29B 7/44* (2013.01); *B29B 7/7461* (2013.01); *B29C 48/86* (2019.02); *B29C 48/91* (2019.02); *B29C 48/919* (2019.02); *D01F 6/04* (2013.01); *D06B 15/00* (2013.01); *D07B 2201/2009* (2013.01); *D07B 2205/2014* (2013.01); *D07B 2501/2061* (2013.01); *D10B 2321/0211* (2013.01); *Y02P 70/62* (2015.11)

(56) References Cited

U.S. PATENT DOCUMENTS

| | | | | |
|---|---|---|---|---|
| 3,118,959 | A * | 1/1964 | Westeen | H03H 11/20 264/202 |
| 3,210,452 | A * | 10/1965 | Howard | D01F 6/04 264/203 |
| 3,227,794 | A * | 1/1966 | Anderson | D01D 1/09 264/205 |
| 3,445,442 | A * | 5/1969 | Weldy | C08F 10/14 526/348.1 |
| 3,448,185 | A * | 6/1969 | Sims | D01D 5/0885 264/178 F |
| 3,536,219 | A * | 10/1970 | Williams | D01F 6/66 264/210.7 |
| 3,627,867 | A * | 12/1971 | Schwarz | C08K 5/1515 264/211 |
| 3,629,053 | A * | 12/1971 | Kimura | C08L 67/02 428/374 |
| 3,998,439 | A * | 12/1976 | Feix | B29C 45/1816 366/76.91 |
| 4,129,632 | A * | 12/1978 | Olson | D01D 5/42 264/40.1 |
| 4,214,859 | A * | 7/1980 | Anders | B29C 48/395 366/152.6 |
| 4,344,908 | A * | 8/1982 | Smith | D01F 6/04 264/203 |
| 4,356,138 | A * | 10/1982 | Kavesh | D01F 6/04 264/164 |
| 4,413,110 | A * | 11/1983 | Kavesh | D01F 6/02 264/164 |
| 4,440,711 | A * | 4/1984 | Kwon | D01F 6/14 264/185 |
| 4,455,273 | A * | 6/1984 | Harpell | C08J 5/046 264/184 |
| 4,484,878 | A * | 11/1984 | Anders | G01F 23/16 425/135 |
| 4,504,432 | A * | 3/1985 | Kamei | D01F 6/04 264/177.13 |
| 4,536,536 | A * | 8/1985 | Kavesh | D01F 6/04 264/184 |
| 4,551,296 | A * | 11/1985 | Kavesh | D01F 6/02 264/184 |
| 4,662,836 | A * | 5/1987 | Kelchner, Jr. | D04H 13/00 264/435 |
| 4,734,196 | A * | 3/1988 | Kono | B01D 67/0009 210/500.36 |
| 4,784,820 | A * | 11/1988 | Kavesh | B29C 48/022 264/349 |
| 4,789,507 | A * | 12/1988 | Wesley | D01D 1/09 264/29.2 |
| 4,871,500 | A * | 10/1989 | Harms | B29D 7/01 264/178 R |
| 4,883,628 | A * | 11/1989 | Kwon | D01D 5/00 264/178 F |
| 4,916,198 | A * | 4/1990 | Scheve | C08F 110/06 526/351 |
| 5,068,073 | A * | 11/1991 | Pennings | D01F 6/04 264/205 |
| 5,127,450 | A * | 7/1992 | Saatkamp | B29B 17/0005 141/9 |
| 5,213,745 | A * | 5/1993 | Izod | D01F 13/04 264/203 |
| 5,230,854 | A * | 7/1993 | Izod | D01F 13/04 264/203 |
| 5,256,358 | A * | 10/1993 | Shiraki | B29C 55/005 264/210.7 |
| 5,368,385 | A * | 11/1994 | Adamo | B01F 1/00 366/139 |
| 5,456,748 | A * | 10/1995 | Quigley | D01F 2/00 106/200.1 |
| 5,508,319 | A * | 4/1996 | DeNicola, Jr. | C08J 3/28 522/161 |
| 5,547,626 | A * | 8/1996 | Ohta | C08F 110/02 264/203 |
| 5,554,668 | A * | 9/1996 | Scheve | C08F 110/06 522/157 |
| 5,736,244 | A * | 4/1998 | Kavesh | D07B 1/025 428/394 |
| 5,860,737 | A * | 1/1999 | Hauser | B01F 3/2223 366/139 |
| 5,921,675 | A * | 7/1999 | Zikeli | B01F 15/0288 366/186 |
| 6,448,359 | B1 * | 9/2002 | Kavesh | D01D 4/02 525/55 |
| 6,969,553 | B1 * | 11/2005 | Tam | D01F 6/04 428/364 |

(56) References Cited

U.S. PATENT DOCUMENTS

| | | | |
|---|---|---|---|
| 7,147,807 B2* | 12/2006 | Kavesh | D01F 6/04 264/37.13 |
| 7,223,470 B2* | 5/2007 | Twomey | D01F 6/04 428/364 |
| 7,344,668 B2* | 3/2008 | Tam | B29C 48/05 264/210.8 |
| 7,370,395 B2* | 5/2008 | Tam | D02J 1/22 264/211.17 |
| 7,674,409 B1* | 3/2010 | Tam | B32B 5/28 264/103 |
| 7,846,363 B2* | 12/2010 | Tam | D01F 6/04 264/211.15 |
| 7,935,283 B2* | 5/2011 | Tam | D01D 5/12 264/103 |
| 2003/0155673 A1* | 8/2003 | Zikeli | D01D 4/00 264/40.6 |
| 2006/0199931 A1* | 9/2006 | Poon | D01F 6/30 526/346 |
| 2007/0145630 A1* | 6/2007 | Simmelink | D01D 5/04 264/165 |
| 2007/0154651 A1* | 7/2007 | Weiss | B32B 27/08 427/532 |
| 2007/0202330 A1* | 8/2007 | Peng | C08L 23/10 428/375 |
| 2007/0231572 A1* | 10/2007 | Tam | C08J 3/091 428/364 |
| 2008/0042309 A1* | 2/2008 | Zikeli | D01D 5/06 264/40.1 |
| 2008/0048358 A1* | 2/2008 | Zikeli | B29C 48/92 264/211.24 |
| 2008/0054516 A1* | 3/2008 | Kwon | D01D 1/02 264/211 |
| 2008/0305331 A1* | 12/2008 | Tam | B29C 48/405 428/374 |
| 2009/0004325 A1* | 1/2009 | Bacher | B29B 7/242 425/586 |
| 2009/0163679 A1* | 6/2009 | Do Nascimento | C08F 10/02 526/65 |
| 2009/0202853 A1* | 8/2009 | Magno | D01D 5/12 428/523 |
| 2010/0092687 A1* | 4/2010 | Sumida | D04H 1/72 427/472 |
| 2010/0122517 A1* | 5/2010 | Simmelink | D01D 5/04 57/200 |
| 2010/0160525 A1* | 6/2010 | Geisler | B29C 48/385 524/422 |
| 2010/0196706 A1* | 8/2010 | Kwon | D01D 1/02 428/364 |
| 2010/0233480 A1* | 9/2010 | Hu | D01D 1/02 428/401 |
| 2010/0286728 A1* | 11/2010 | Simmelink | B29C 48/022 606/228 |
| 2011/0266710 A1* | 11/2011 | Tam | D01D 1/02 264/210.7 |
| 2012/0140587 A1* | 6/2012 | Liechti | B29B 7/38 366/76.4 |
| 2012/0306109 A1* | 12/2012 | Chen | D01D 5/06 264/12 |
| 2013/0079483 A1* | 3/2013 | Robert | C08F 10/02 526/352 |
| 2013/0143987 A1* | 6/2013 | He | D01D 1/02 524/161 |
| 2013/0216812 A1* | 8/2013 | Cheng | C08L 23/0815 428/220 |
| 2013/0225022 A1* | 8/2013 | Tam | D04H 13/00 428/401 |
| 2013/0260624 A1* | 10/2013 | Rastogi | C08F 4/52 442/1 |
| 2014/0065913 A1* | 3/2014 | Klein | D06M 15/693 442/333 |
| 2014/0288256 A1* | 9/2014 | He | D01D 5/12 526/352 |
| 2014/0342109 A1* | 11/2014 | Mencke | D01F 6/04 428/36.3 |

* cited by examiner

SYSTEM AND METHOD OF DOSING A POLYMER MIXTURE WITH A FIRST SOLVENT, DEVICE, SYSTEM AND METHOD OF EXTRACTING SOLVENT FROM AT LEAST ONE POLYMERIC YARN, SYSTEM AND METHOD OF MECHANICAL PRE-RECOVERY OF AT LEAST ONE LIQUID IN AT LEAST ONE POLYMERIC YARN, AND CONTINUOUS SYSTEM AND METHOD FOR PRODUCING AT LEAST ONE POLYMERIC YARN

CROSS REFERENCE TO RELATED APPLICATION

This application is a divisional of U.S. application Ser. No. 15/032,826, which was filed in the United States Patent and Trademark Office on Apr. 28, 2016.

TECHNICAL FIELD

The present invention is related to a method and equipment for producing ultra-high performance yarns. More specifically, the present invention describes a continuous method for producing polyolefin yarns having ultra-high tenacity and modulus according to a suspension dosage system, prior oil recovery machines and high efficiency extractors.

DESCRIPTION OF THE STATE OF THE ART

The term high performance yarn is used to classify highly oriented polymeric materials in the direction of the fibers which materials are characterized by having high mechanical strength and high elastic modulus, especially considering their density.

A steel cable, for example, comprises steel yarns of high tensile strength, which is around 2 to 3 GPa and an elastic modulus of about 200 GPa. A high performance aramid yarn, for example, from the Kevlar® product family (manufactured by DuPont) or Twaron® (manufactured by Teijin), has a tensile strength of between 2.8 and 3.6 GPa and an elastic modulus of between 60 and 70 GPa.

A UHMWPE (ultra-high molecular weight polyethylene) high performance yarn manufactured by DSM and by Honeywell has a tensile strength of between 3.0 and 3.6 GPa and an elastic modulus of between 80 and 130 GPa. However, upon comparing these materials as to their performance in commercial applications, the specific strength, where density is taken into account, is the most important parameter.

When the material is in the form of a yarn, the specific strength thereof is given by the breaking strength divided by its linear density. In the International System of Units, the linear density of textiles is designated by tex (weight, in grams, of 1,000 m of yarn) and the specific strength unit— cN/dtex—is one of the most used units. Thus, densities of the steel, aramid and UHMWPE yarns are, respectively, of 7,860 kg/m$^3$, 1,440 kg/m$^3$ and 970 kg/m$^3$. Based on the densities, their respective specific strengths are, therefore, between 3 to 4 cN/dtex for steel yarns, 19 to 24 cN/dtex for aramid yarns and 31 to 37 cN/dtex for UHMWPE yarns. The specific modules are of about 250 cN/dtex for the steel yarn, between 400 to 500 cN/dtex the aramid one and between 825 and 1340 cN/dtex for the UHMWPE yarn.

Due to its specific strength and modulus, the UHMWPE yarn is deemed to be the yarn having the greater textile performance existing in the market and for that reason it has been used in noble applications such as ballistic protection and anchorage of Offshore oil and gas platforms and more recently as a surgical yarn, sports articles and so on.

The great scientific interest that has motivated the industrial development of high performance yarns came from studies from the 30's and 50's. Reports published by Carothers et al. and Mark have shown the high potential of the mechanical properties of polymeric materials if their chains could be oriented in the same direction.

According to the mentioned document, polymeric chains have extremely high theoretical mechanical properties, so if any method of polymeric processing was capable of providing orientation to these chains, materials of high mechanical performance could be produced. However, only in the 70's the first methods capable of producing these materials were developed. Among these methods, we can mention spinning and solidification of liquid crystals generating the Kevlar®, carbonization of precursor polymeric fibers giving rise to the carbon fiber, superdrawing of yarns and linear polyethylene films and crystallization of flexible molecular chains under high elongational flow, which resulted in a series of materials of high elastic modulus and high mechanical strength.

In this context, in the late 70's G. C. E. Meihuizen, N. A. J. Pennings and G. A. Zwijnenburg published document U.S. Pat. No. 4,137,394, which describes a method for the production of a UHMWPE yarn based on the molecular orientation of the UHMWPE polymeric chains in solution under high elongational flow obtained in an equipment based on the Couette apparatus. However, this production method was still very little productive to render the UHMWPE yarn industrially viable.

Publication of document U.S. Pat. No. 4,137,394 has motivated a series of important scientific and technological publications, wherein several methods for producing this material are proposed. Then in the early 80's, there were published patent documents that provided the two main preparation processes that currently dominate the International Market of the UHMWPE yarn. Such yarn is known by the acronyms HPPE (High Performance Polyethylene yarn) and HMPE (High Modulus Polyethylene Yarn).

Document GB 2,042,414A discloses a method for the manufacture of high performance yarns that is currently known as "volatile solvent based gel spinning process" or "decalin based gel spinning process", hereinafter simply designated as "decalin based process". This method was marketed under the brand name Dyneema®.

In the method described therein, a single solvent is used such that any solvent having a solubility parameter compatible with the polyethylene and that can stand the thermal conditions of the method can be chosen. However, for practical applications, the decalin solvent became the most viable technical-economical solution. The main economic advantage of this method is that the solvent used to dissolve UHMWPE is evaporated in drawing steps which follow the spinning step, and the heat required for drawing is also used to evaporate the solvent, which renders the decalin-based method more attractive when OPEX (operational expenditure) is taken into account.

However, there are several negative aspects related to decalin-based technology that should be taken into account. Because decalin solvent is highly flammable and potentially explosive, industrial security issues are highlighted. Thus, isolation of the productive units is required, so the area where all the electric components are installed must be explosion-proof.

Therefore, to seek internal inertization of the production units, a considerable amount of nitrogen is consumed and/or other security measures are taken, which considerably affect the CAPEX (capital expenditures) of production plant facility.

Furthermore, in addition to the industrial safety and capital expenditures aspects, another issue that has to be taken into account is salubrity and the environmental impact of using solvents from the decalin family, which are highly toxic and potentially carcinogenic. This implies in the need for controlling and monitoring the industrial environment such that exposure limits are not exceeded. Leaks of this solvent to the environment can have catastrophic consequences, especially in the aquatic environment.

U.S. Pat. No. 4,413,110 discloses a method for the manufacture of high performance yarns that is currently known as "non-volatile solvent based gel spinning process" or "mineral oil based gel spinning process", hereinafter simply designated as "mineral oil-based process". This method was marketed under the brand name Spectra®. In spite of the patent documents describe several solvents, there are significant differences between the two methods.

In this method for producing the HMPE yarn, in turn, two solvents are used. The first solvent has the feature of having low vapor pressure (not being significantly volatile under the dissolution and spinning conditions) and having a solubility parameter compatible with UHMWPE. Thus, in contrast to decalin, the solvent does not evaporate during drawing in stages before spinning, which causes the use of a second, more volatile solvent to replace it in a step commonly known as washing or extraction step to be required. Any high vapor pressure volatile solvent may be utilized, as long as it has the ability to dissolve the first solvent. Also, due to technical-economic reasons, solvents such as mineral oil are commonly used as the first solvent, as well as n-hexane.

As compared to the decalin-based method, the mineral oil based method has the advantage of being cheaper and not dangerous in steps where mineral oil is present. From the industrial area point of view, the highest risk steps would be restricted to the yarn washing and drying units, where the second solvent is flammable, which reflects in a lower capital expenditure (CAPEX) in the industrial plant as compared to the expenditure required for a plant using decalin-based technology.

The main disadvantages of the mineral oil-based method are related to the need of using a second solvent and a washing or extraction step. While the first solvent is easily removed by evaporation, during the drawing step of the decalin-based method, mineral oil is very difficult to be extracted. Extraction of mineral oil by n-hexane, for instance, is made by a difficult dilution mechanism that takes place competitively within the micelles or pores formed during yarn coagulation that occurs just after spinning inside quenching tanks. Chemically, oil, polyethylene and n-hexane are very similar to each other, which makes the extraction method even harder.

An additional drawback of this method when compared with the decalin method is related to the separation or recovery step of both solvents. While separation of oil and n-hexane is an easy method due to the large difference between the boiling points of the two solvents, purification of mineral oil is extremely complex.

Oil purification is the removal of n-hexane residues from oil until safe levels are achieved. A small amount n-hexane residue in mineral oil is sufficient to reduce the flash point of the oil to undesired levels. Therefore, the larger the volume of mechanically recovered oil prior to the extraction step, the more economically advantageous the method becomes.

As discussed above, another disadvantage of the mineral oil based-method is related to the difficulty in controlling heterogeneous deformations that may take place in the steps of extraction and drying of the yarn. Both the extraction efficiency and the control of heterogeneous deformations along the yarn are functions of the design of the equipment used in the extraction and drying units. Every local deformation occurring heterogeneously in these steps will hardly corrected in the following steps, which significantly reduces the mechanical properties.

Mineral oil recovery and treatment methods used in the current technologies address these aspects in many ways. The greater representative of this technology, which developed it in the 80's, is Honeywell (Spectra yarn manufacturer). U.S. Pat. No. 4,413,110, for example, describes a mineral oil-based method where a yarn is obtained continuously. On page 9 of said document, aspects related to swelling and shrinkage phenomena inside the oil extraction equipment are reported. In document U.S. Pat. No. 4,551,296 a series of second solvents (extraction solvents) is tested and the choice for CFCs family solvents is explained.

Currently, Honeywell is the world's only known manufacturer that uses mineral oil based technology in a continuous manner. Details about their extraction equipment are not discussed in their patent documents. However, the main disadvantage of the process is related to environmental aspects due to using solvents from the chlorofluorocarbon family. Using these solvents reduces the industrial risk during the extraction step, as they are not flammable. They have low boiling point and are not chemically similar to mineral oil, which makes the separation thereof in the solvent recovery unit easier. Patent document U.S. Pat. No. 4,551,296 also shows advantages related to the mechanical property level. Such phenomenon could be related to the residual oil generated by an ineffective extraction in experiments using n-hexane.

Alternately, due to the high costs involved in the processing of high amounts of oil and water, which are dragged by the yarn into the extractors, some Chinese manufacturers were lead to split the mineral oil-based method into non-continuous steps, which method is commonly known as batch method.

Even though the use of this method has certain economic advantages, aspects related to quality control of the yarn, high labor load and environmental impact due to the high rate of solvent evaporation in extraction tanks are shown as strong disadvantages of using decantation as a mechanical tool to pre-recover an oil fraction before processing of the yarn in the extractor.

Also, quality of the yarns produced by the mineral oil based technology is related to deformation control (shrinkage and/or drawing) and oil content along the yarn. Gel yarn is very sensitive to deformation and oil exudation is directly related to the time and degree of freedom of the yarn due to shrinkage. Thus, yarns are deposited on regions of the settling box where yarn segments are more free to shrink and exude more oil, which causes uneven deformations along the yarn that are difficult to be corrected in the final (drawing) step.

Additionally, it is difficult to prevent deformation fluctuations in the steps of feeding the extractors, which can result in a drastic reduction in the mechanical properties of the produced yarns. In order to prevent these deformations, the manufacturer has to reduce the drawing ratio in the final drawing step, which drastically affects mechanical properties such as tenacity, modulus and creep.

Using tanks for washing the yarn, in turn, has an intrinsic disadvantage related to two main aspects. The first is directed to the ratio of the cross-sectional area of the yarn to the cross-sectional area of the tank. In other words, geometric aspects related to the tank cause the use of a large volume of extraction liquid to be required. Only those liquid layers close to the yarn participate in the extraction method. It causes a higher liquid feed rate and a higher liquid inventory which represents larger industrial hazard. The second aspect is related to the difficulty in causing turbulence inside the extraction compartments, wherein turbulence (expressed in Reynolds number) and temperature are the two driving forces that can be used to increase efficiency of the extractors.

Some modifications are currently being used to improve efficiency of the tanks. However, aspects such as labor costs, high length of the tanks, cost of the tanks and non-availability of continuous pre-recovery equipment are some factors that cause the Chinese manufacturers to use batch methods whenever mineral oil based technology is used.

OBJECTS OF THE INVENTION

The object of the present invention is to provide a continuous mineral oil based method for the manufacture of a polyolefin UHMWPE yarn having a reduced amount of a second solvent.

The present invention is also intended to provide a device for extracting a first solvent used in a method for the manufacture of a UHMWPE yarn having optimized yarn residence time.

Finally, the present invention is intended to provide a suspension dosing device used to deliver a homogeneous mixture to an extruder in a method for manufacturing a polyolefin yarn.

BRIEF DESCRIPTION OF THE INVENTION

The present invention is directed to a method and a system for the manufacture of at least one polymeric yarn comprising means for mixing a polymer with a first solvent yielding a mixture; means for homogenizing the mixture; means for rendering the mixture inert; means for dipping the mixture into a quenching bath, wherein an air gap is maintained before the mixture reaches the quenching bath liquid surface forming at least one polymeric yarn; means for drawing the at least one polymeric yarn at least once; means for washing the at least one polymeric yarn with a second solvent that is more volatile than the first solvent; means for heating the at least one polymeric yarn; means for drawing at room temperature the at least one polymeric yarn at least once; and means for heat drawing the at least one polymeric yarn at least once.

The subject invention also concerns a system and method of dosing a polymer mixture with a first solvent into an extruder (26), a device, a system and a method of solvent extraction from at least one polymeric yarn, and a method and system of mechanical pre-recovery of at least one liquid in at least one polymeric yarn.

DESCRIPTION OF THE FIGURES

The following detailed description makes reference to the accompanying drawings, in which.

DETAILED DESCRIPTION OF THE INVENTION

The following description will be based on a preferred embodiment of the invention. As will be evident to the skilled person, however, the invention is not restricted to this particular embodiment.

According to a preferred embodiment that will be described herein, the present invention provides a method for the production of a ultra-high performance yarn, preferably, a yarn comprising ultra-high molecular weight polyolefin, wherein such yarn is produced with a technology known as mineral oil based technology.

Figure 1:
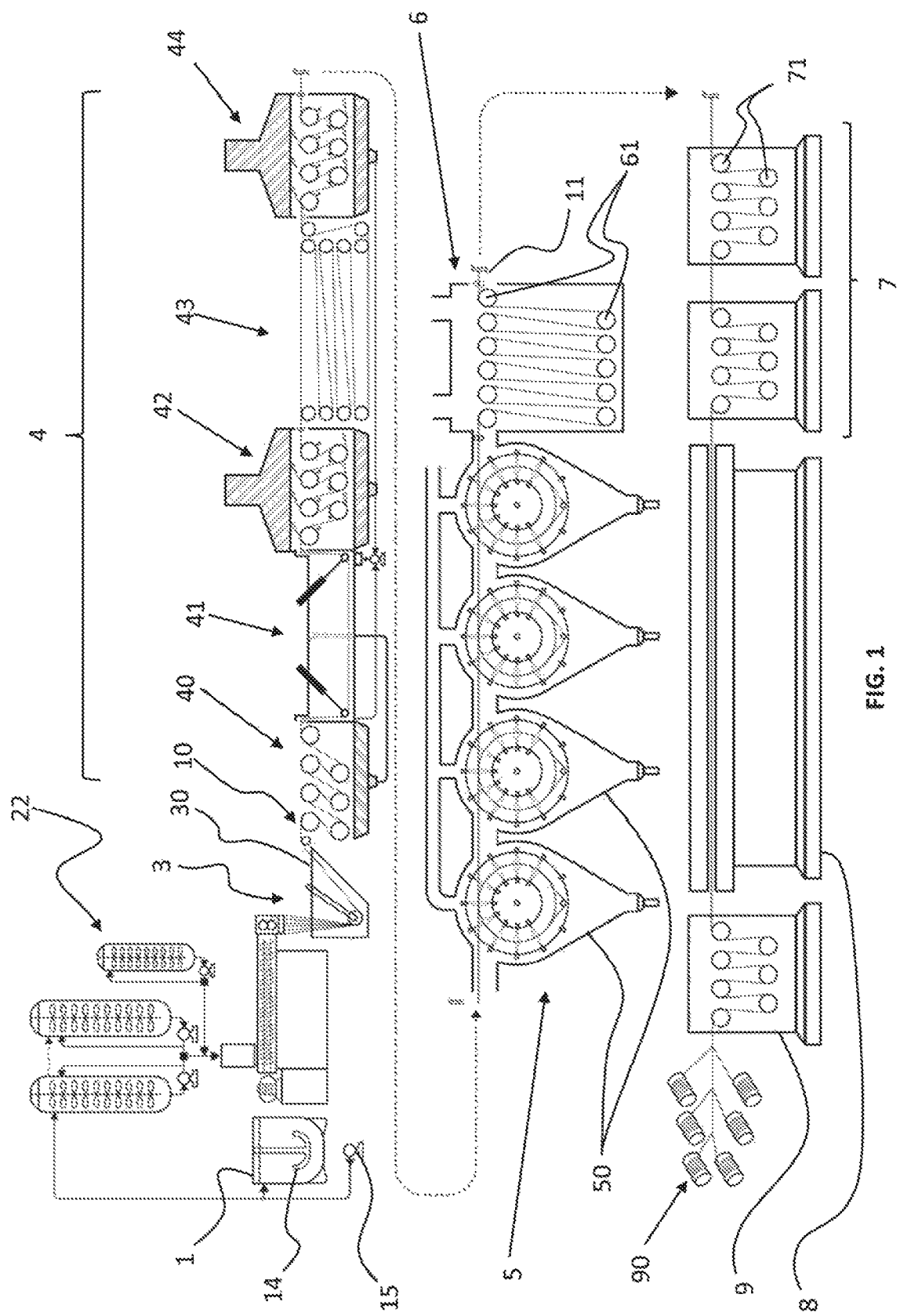
FIG. 1 illustrates a schematic view of a system for the manufacture of polymeric yarns, according to an optional configuration of the present invention.

FIG. 1 illustrates a system for the manufacture of a polyolefin yarn comprising all the units required for the execution of the steps of the presented optional configuration of the method of the present invention, namely:

(a) mixing, with the aid of the premix vessel 1, the ultra-high molecular weight polyolefin polymer with the first solvent and additives;

(b) transferring the mixture to a homogenization and inertization device, optionally a homogenization/inertization tank 21,22, where the mixture will remain for a time sufficient to become homogeneous and virtually free of oxygen;

(c) dosing the mixture, steadily and intermittently, with the aid of a dosing device 25 in an extruder 26;

(d) dissolving the polymer in the first solvent under an intensive condition, within the extruder 26, so as to form a homogeneous solution;

(e) dosing the solution in a volumetric and precise manner through an orifice die 27, providing the solution with the shape of a yarn;

(f) dipping the solution, in the form of a yarn, in a water bath, known as a quenching bath 30, such that the yarn, before reaching the water surface, passes through an air gap for the solution to coagulate thereby forming the polymeric yarn 10 (gel yarn);

(g) passing said gel yarn through a tower of feeding rolls 40, such that part of the water dragged by the yarn from the quenching bath 30 and a fraction of the first solvent, exuded from the yarn in the coagulation, are drained by the action of gravity;

(h) drawing 41 the gel yarn 10 in a tank 410 containing a liquid medium;

(i) passing the drawn gel yarn through a first pre-recovery enclosure 42, wherein the first exuded solvent and liquids dragged from the drawing tank 410 are mechanically retained;

(j) passing the yarn through an accumulator 43 such that the residence time is sufficient for the exudation method to be complete, exposing a greater volume of a first solvent on the surface of the yarn;

(l) passing the gel yarn through a second pre-recovery enclosure 44, wherein the residual solvent fraction exuded by the yarn in the accumulator 43 can be mechanically retained;

(m) feeding the gel yarn containing a reduced fraction of the first solvent with a second solvent in an extraction unit 5 (FIGS. 1 to 13);

(n) passing the gel yarn, containing the second solvent, through a dryer 6, wherein the second solvent is substituted with a heated gas, yielding xerogel yarn 11;

(o) drawing the xerogel yarn between at least two roll towers 7 at room temperature;

(p) heat drawing the yarn in a draw oven 8 yielding the POY (Pre Oriented Yarn) yarn; and (q) storing the POY yarn in bobbins 91 in the winding unit 90.

Optionally, a high or ultra-high molecular weight polyolefin is used in the method for the production of a ultra-high performance yarn of the present invention. Polyolefins such as high molecular weight polyethylene or ultra-high molecular weight polyethylene (UHMWPE), such as high and ultra-high molecular weight polypropylene and an ethene-propene copolymer can be used. However, other polymers can be used, such as polyvinyl alcohol, polyesters, polyoxide ethylene. More preferably, ultra-high molecular weight polyethylene (UHMWPE) is used.

For use as a first solvent, any solvent that dissolves the above polymers under the method conditions described herein, can be used. More specifically, any solvent with a solubility parameter consistent with the used polyolefin and which supports the operating temperature of the method can be used. Preferably, any solvent with a solubility parameter consistent with the used polyolefin and which is not considerably volatile at the dissolution temperature can be used. Preferably, mineral oil is used when the polyolefin is ultra-high molecular weight polyethylene. More preferably, the solvent is preferably chosen from classes such as aliphatic hydrocarbons, cycloaliphatic hydrocarbons, aromatic hydrocarbons, halogenated hydrocarbons, and mixtures thereof. In another context, the first solvent should have a vapor pressure greater than 20 kPa or a boiling point greater than 180° C. and that dissolves the polymer under the process conditions described in the invention.

In the context of the instant invention, when ultra-high molecular weight polyethylene is used, the molecular weight (Mw) should be greater than 500,000, preferably greater than 1,000,000, and more preferably even greater than 2.000.000. When such polyolefin is used, it is recommendable to use a suitable amount of antioxidant. In addition, substitution of air with nitrogen or any other inert gas in the dissolution conditions is preferably adopted.

The polymer concentration is recognized as one of the main method variables in the technology related to the context of the present invention. Such polymer concentration in the first solvent is linked to technical and economic aspects of the method. In context of the present invention, the concentration choice will be, therefore, a result of the balance between the intended better mechanical property and the method cost. In this regard, the mass concentration range of the polymer in the first solvent is from 3 to 30%, preferably, from 5 to 20% and, even more preferably, of from 8 to 15%.

Referring again to FIG. 1, a schematic representation of the optional configuration of the method of the present invention is shown, where a number of mixing and dosing devices are placed such that the polymer mixture, first solvent and additives can be appropriately added to an extruder 26. For ease of nomenclature, the set formed by all the devices involved in the function of providing a homogeneous mixture in the extruder 26 will be hereinafter designated as dosing device 25.

Furthermore, the system of the present invention comprises a premix vessel 1 where suitable amounts of the components are added such that a homogeneous mixture is obtained. The premix vessel 1 optionally comprises a mixing impeller 14, a pumping device 15, preferably of the jet mixing type, to cause the mixture to be constantly stirred from the bottom of the premix vessel to the top thereof. Therefore, the mixture is homogenized during the required time before being pumped to at least one inertization device 21,22. For ease of nomenclature, the inertization device will also be designated as inertization vessel herein.

Optionally, the at least one inertization vessel 21,22 still provides homogenization of the mixture in a similar fashion as the premix vessel. However, the inertization vessel 21,22 further comprises an inertization gas flow used to extract oxygen from the mixture, thereby causing it to be inert. The oxygen content in the mixture is optionally monitored by suitable sensors until acceptable levels are achieved.

Optionally, the system of the present invention comprises two inertization vessels, as illustrated in FIG. 1.

Dosing of the mixture in the extruder can be made by any dosing device known in the state of the art, provided that it can maintain a homogeneous solids concentration. The dosing device 25 is intended to continually feed the extruder 26 with the homogeneous and inertized mixture provided by the inertization vessel 21,22.

Figure 2:
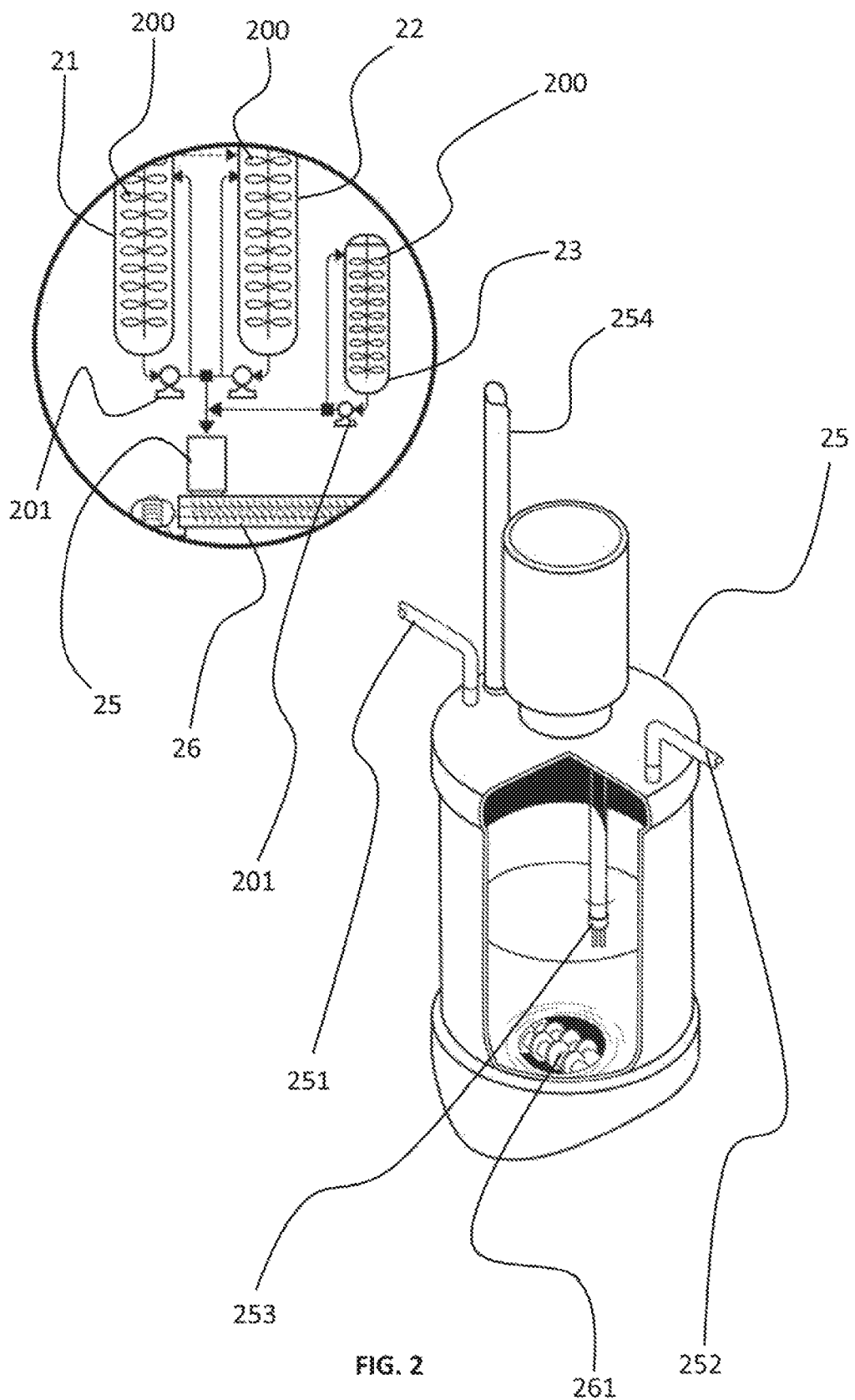
FIG. 2 illustrates a schematic view of a dosing system of a solvent mixture with a polymer in accordance with an optional configuration of the present invention.

FIG. 2 illustrates a dosing device 25, or doser, in accordance with a preferred configuration of the present invention, where dosing is made such that a low level of mixture is always above the screw 261 of the extruder. To that end, the level is adjusted so as to be between an upper limit (above which a column of liquid with no agitation forms a gradient of solid settling) and a lower level that prevents the gas from entering the extruder. Thus, agitation caused by rotation of the extruder screw will ensure homogeneity of the column of mixture. For these settings to be implemented, the dosing device 253 may comprise a level sensor. Thus, where the level of the mixture inside the dosing device 25 is below a pre-determined value, an electrical input deviates a valve to the tube 254, feeding the dosing vessel 25 until an upper level signal reverses the valve back to its original position. In order to prevent contamination by oxygen from air, a flow of inert gas is optionally maintained within the vessel 25. To that end, the dosing vessel 25 optionally comprises a gas inlet tube 251 and a gas outlet tube 252. It should be emphasized that, as noted, any level control device known from the state of the art can be used as the dosage form. However, the above device is preferably used.

Further, the present invention provides the optional use of a start and stop vessel 23 when the described system of preparation, homogenization, inertization and dosing of the mixture is used. Such start and stop vessel 23 is only intended to be used in the beginning and in the end of the described method, since it is intended to provide a more diluted mixture of polymers in the start and final steps of the extruder. This allows for the extruder to be started at the normal rotation of the method, without any damages to the equipment being caused by pressure peaks, which can occur in a start at high rotation. This procedure thus avoids unbalancing of the method caused by a poor dissolution of the mixture present in the inertization vessel. High and ultra-high molecular weight polymers are hard to dissolve and the unbalance of the method, which occurs mainly while starting and stopping the extruder, results in clumps or poorly dissolved particles which act as a defect to the formed yarn, thereby reducing its local drawability. The extruder being started under optimal conditions, in addition to preventing this kind of problem, will lead to rapid stabilization conditions, minimizing the residue volume at the start.

Optionally, the present invention makes use of only two inertization devices 21,22,23 wherein one of the inertization devices, in the steps of start and end of the extruder 25, feeds the extruder 26 with a more diluted polymer mixture, such that this device is thereafter used with the mixture with standard dilution.

Optionally, the dosing device is an container, or an tube, which simply drives the mixture from the inertization device to the extruder. Also, in another optional embodiment, the dosing device is integrated to the extruder, or is part of the extruder.

Therefore, in context of the present invention, the suspension dosage system in the extruder, comprises:

a) a premix vessel 1, where all the components of the suspension are added, comprising a mechanical stirrer and a pumping circuitry, thus ensuring a better homogenization of the mixture;

b) at least one inertization vessel (optionally two vessels) 21,22, comprising a mechanical stirrer 200, a pumping device 201 (optionally of the jet mixing type) constantly circulating the bottom mixture to the top of the vessel 21,22, am inert gas feeding device and a device for measuring the oxygen content, such that inertization is ensured;

c) a dosing device 25 comprising a level control device 253, such that the level of the mixture, as defined by the column of suspension liquid above the level of the extruder screw, can be controlled, wherein the dosing device is fed by at least one inertization vessel, such that a valve installed on the bottom of the inertization vessel controls said feeding and releases a certain volume of suspension when a signal of low level in the dosing vessel is received, optionally, the dosing vessel is fed with a constant flow of inert gas which is maintained throughout the production;

d) a start and stop vessel 23 used in start and stop operations of the production line, comprising a mechanical stirrer 200, a pumping device 201 (optionally of the jet mixing type), an inert gas feeding device and an instrument for measuring the oxygen content, optionally the start and stop vessel 23 comprises a reduced volume as compared with the inertization vessel 21,22, wherein the start and stop vessel 23 is fed with a suspension having low polymer concentration, which yields a solution of lower viscosity and for that reason reduces the start pressures of the extruder, allowing it to be turned on at high rotation speeds.

The mixture or suspension homogenized and inertized by the above mentioned system then feeds an extruder 26. In context of the present invention, any type of extruder known in the state of the art can be used, including, but not limited to single-screw, twin-screw and planetary extruders. Combinations of one or more extruders may be used as well, whenever an improvement in the cost effectiveness of the method is desired. However, in the preferred embodiment now described, twin-screw extruders are preferable.

In the extruder 26 the mixture or suspension is transformed into a solution. Dissolution is a difficult process, where process parameters should be defined for each case and each setting of the extruder used. In a particular configuration, when ultra-high molecular weight polyethylene is dissolved in mineral oil, the temperature must be between 150° C. and 310° C., more preferably, between 180 and 240° C.

The polymer solution in the first solvent, produced by the extruder, is then fed to a spinning head 27, which comprises a spinning pump and a spinning die. The spinning pump serves to dose the solution to the spinning die in a precise manner, which in turn serves to impart the shape of a yarn to the fluid. The spinning die or spinneret has a defined number of capillaries. In context of the present invention, the number of capillaries is not a critical parameter and depends on factors such as the production capacity of the extruder, the spinning technology used, the intended final titer of the yarn, etc. In the capillary of the spinning die, the bulk of polymer will be subjected to a first molecular orientation, which takes place under shear and elongational flow along the capillary.

The yarn of the polymer solution dissolved in the first solvent then passes through the air gap and immerses into the quenching bath 30, where the solution coagulates, yielding the so-called gel yarn 10. In the scope of the present invention, the term air gap is used to define the space traversed by the yarn of the solution, from the outer surface of the spinning die 27 to the liquid surface of the quenching bath 30. The length of the air gap is another variable is critical importance in the method of the present invention. However, it will depend on the spinning condition used. The spinning condition is determined by four variables, basically, the geometry of the capillary, the temperature, flow rate and the use or not of a drawing step after the quenching bath 30. Such drawing will be hereinafter designated as draw down.

When a little or no draw down is adopted, the length of the air gap is preferably of less than 15 mm, more preferably of less than 10 mm, on the other hand, the minimal length of the adopted air gap is 2 mm, preferably greater than 4 mm.

However, when draw down stretches are applied to the yarn, the adopted air gap length is greater than 5 mm, preferably greater than 15 mm.

In turn, as already explained, the quenching bath 30 serves to transform the solution into a gel yarn. The gel yarn is a structure composed of a pre-oriented, polymer-containing porous phase that comprises almost the entire volume of liquid comprising the first solvent. Any liquid, in principle, can be used as a quenching liquid, provided that it does not affect the properties of the yarn. When the polymer used us ultra-high molecular weight polyethylene, water is the preferred solvent. The temperature of the quenching bath must be of less than 60° C., preferably of less than 30° C., more preferably of less than 20° C.

Then, the gel yarn 10 formed in the quenching bath and containing a large portion of the volume of the first solvent and water dragged from the quenching bath is fed to a pre-recovery and draw unit in a liquid medium. For ease of nomenclature, the pre-recovery and draw unit in liquid medium will be hereinafter simply designated as pre-recuperator.

A pre-recuperator has a first function of mechanically retaining the largest volume as possible of the first solvent, such that the extractors are not overloaded, which would increase the operational cost of the method. Optionally, the pre-recuperator may perform an intermediate draw on the yarn, which can reduce the draw load that will occur in subsequent steps. The draw limit in this step is determined by the beginning of damage to the polymeric structure and is determined by the final mechanical properties. In the scope of the present invention, the relative amount of the first solvent retained by the pre-recuperator prior to the extraction step is designated pre-recovered amount of solvent and is represented by a pre-recovery index. The pre-recovery index is described by the percent ratio of the mass or volume of solvent transported by a certain length of the yarn that exits the pre-recuperator and the yarn entering the pre-recuperator.

As already discussed, one disadvantage, if not the greatest, of the mineral oil base technology is the need for recovering a large volume of the first solvent using a second, more volatile solvent. When, for example, the first solvent is mineral oil and the second solvent is of the n-hexane type, the separation thereof in a distillation column is relatively easy due to the large difference in the boiling points of the mixture components. However, even if the distillation column is very efficient, the n-hexane content present in the oil of the bottom of the column remains elevated.

A small n-hexane concentration in the mineral oil is sufficient to drastically reduce its flash point, which generates an industrial hazard when the oil is recycled to the method. It requires the use of a second separation operation herein designated as oil purification. The purification step adds up cost to the method since it is a slow and high cost operation. Another issue related to the cost is the volume of the second solvent involved in the method. The larger the volume of the first solvent entering with the yarn in the extraction unit, the greatest will be the consumption of the second solvent. Which consumption can also be increased by the ineffectiveness of the extractors.

Manipulation of a large volume of the second solvent leads to a greater investment in the solvent recovery unit and higher industrial hazard. One of the criteria for ranking hazard radius is the volume of flammable solvent present in the industrial area. Another issue related to the volume of the first solvent is the amount of the second solvent to be evaporated in the drying unit. Since the amount of the first solvent is substituted with approximately the same amount of the second solvent in the extraction method, the lower the volume of the first solvent entering the extractors, the lower will be the amount of the second solvent to be evaporated in the drying unit.

Figure 3:
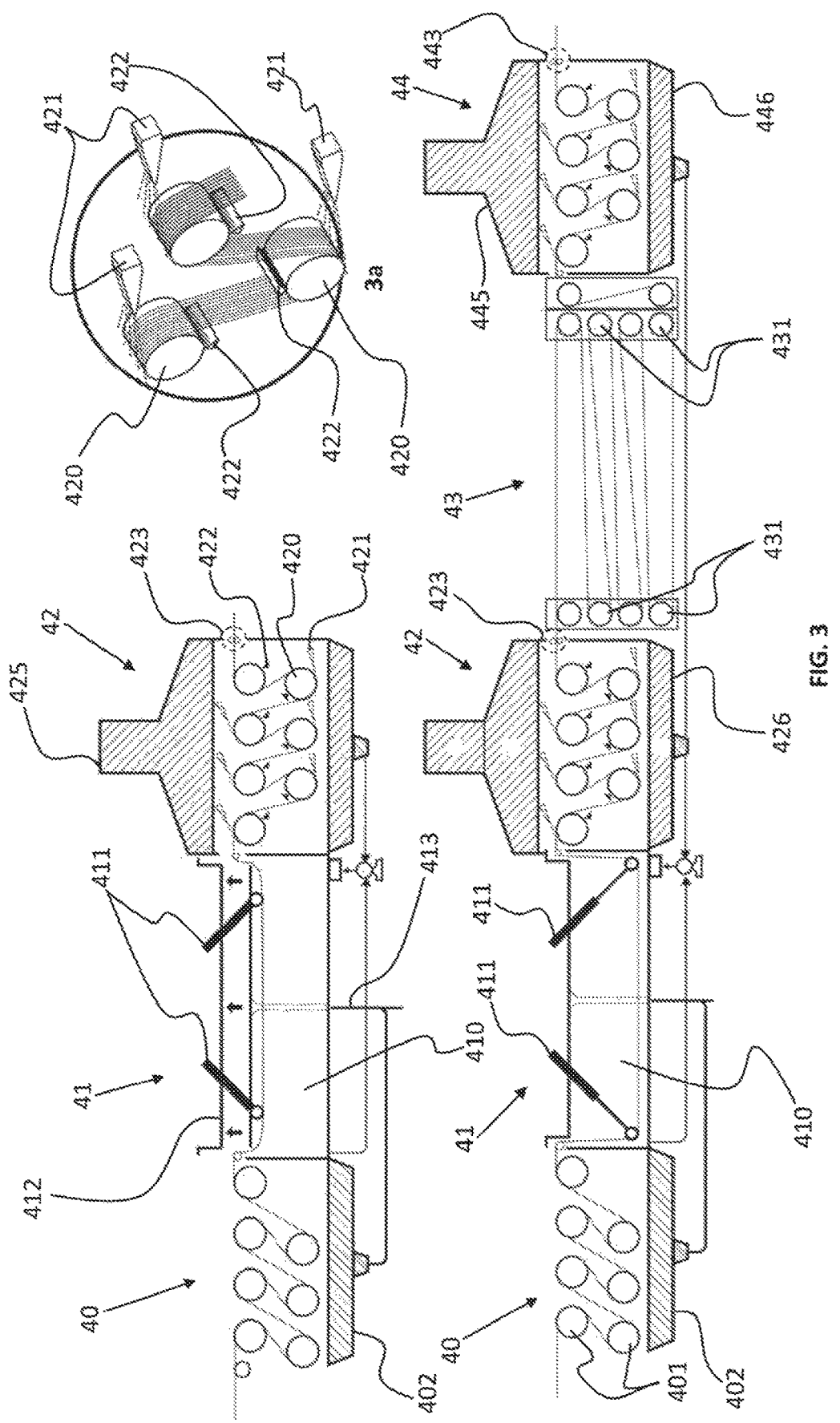
FIG. 3 illustrates a view of a mechanical pre-recovery system of a first solvent in accordance with an optional configuration of the present invention.

FIG. 3 illustrates an optional configuration of a pre-recovery system 4 (or pre-recuperator), in accordance with the present invention, comprising five optional main devices. The first device comprises a tower of feeding rolls 40 of the pre-recuperator 4, wherein the number of rolls 401 depends on factors such as the stretching strength and the minimum contact perimeter for no slippage to occur. In practice, the number of rolls 401, as well as the diameter thereof is the result of a relationship between the cost of the machine and the likelihood of slippage. The number of rolls 401 outlined in FIG. 3 is therefore merely illustrative.

The tower of feed rolls 40 can also serve as a tower of spinning rolls, that is, to pull yarns formed on the spinning die passing through the quenching bath. Since the yarns passing through the quenching bath carry an amount of water and first solvent, a collector tray can be installed on the lower part of the tower, which will receive any amount of these solvents from the rolls.

The pre-recovery system illustrated in FIG. 3 further comprises a drawing tank 410, where a liquid serves to provide heat to the gel yarn, which will be stretched between the feed tower 40 and a first pre-recovery enclosure 42. The drawing bath basically comprises a drawing tank 401, a lid 412, at least one driver 411 (two drivers are illustrated) for immersion of the yarn into the tank 410, a drain 413, a heat exchanger and a circulation pump.

Using immersion drivers 411 facilitates passing the yarns through the tank 410 during the start operation, such that the drivers 411 are capable of drawing the yarn inside the tank 410, pushing the yarn to the bottom of the tank 410. The immersion drivers 411 serve, therefore, to maintain the yarn immersed in the tank 410 after being passed in the start operation.

The tank 410 can also comprise a lid 412 serving to isolate the system from external contamination, to prevent accidents by the contact of the heated liquid and to thermally isolate the tank.

Circulation of the heated liquid within the tank 410 may be optionally performed with the aid of a pump and a heat exchanger, together with an inert gas disperser. Dissolution of the inert gas into the liquid is recommended when the drawing liquid medium is the mineral oil used as first solvent. In a stable stage of the method, an inert gas-containing atmosphere injected into the disperser is formed between the surface of the liquid and the lid. The design of the tank must take into account a low inventory and the absence of neutral positions for no additional degradation of the first solvent to occur in this step.

The third part of the pre-recuperator comprises a first pre-recovery enclosure 42. The first pre-recovery enclosure 42 serves to retain the major portion of the first solvent exuded during drawing in the tank 410, as well as the liquid used as a thermal medium in drawing, which is dragged by the yarn. The first pre-recovery enclosure 42 has a roll tower 420 having two main functions, the first is to draw the gel yarn that passes the drawing bath and the second is of acting as a support where mechanical action of compressed air knives 421 and scrapers 422 will retain any liquid contained on the surface of the yarn filaments.

In context of the present invention, compressed air blades 421 are optionally used to prevent a large portion of the liquid volume dragged by the yarn from passing to the next steps. When yarns containing the filaments are driven onto the surfaces of rolls 420, the filaments spread as ribbons. Surprisingly, when compressed air blades 421 are duly directed tangentially (relative to the roll 420) and transversally (relative to the gel yarn), a major amount of liquid is retained.

Part of the retained liquid is projected away from the roll surface 420 and a portion of the liquid is adhered thereto. Therefore, to prevent part of the liquid adhered to the roll 420 from wetting the yarn, optionally a scraper device 422 is designed so as to transfer this volume to the end of the roll 420. Devices transforming compressed air into laminar flows of high speed are found commercially. An example is the so-called air knives from Spraying Systems Co' capable of concentrating a compressed air jet in very precise geometrical shapes, which considerably reduces air consumption. Optionally, other liquid retention devices can be used, such as rubber-coated devices commonly known in the textile industry, such as Foulards.

The use of devices for liquid retention, especially air blades 421, has shown to be suitable for retaining the mineral oil, wherein one can observe that air penetrates between the yarn filaments, expelling a large amount of liquid. The use of air knives, or any device operating in an obvious manner, along with another support device capable of removing the liquid adhered to the surface of the draw roll 420 are considered herein as the mechanical driving power that was shown to be sufficiently more efficient than decantation and made it possible for one to recover a large volume of the first solvent prior to the use of a chemical action (use of the second solvent).

FIG. 3a illustrates in detail an optional embodiment of these devices, where the air knife 421 and the rubber scrapers 422 can be seen over the rolls. The representation is schematic and other assembly configurations are possible. For practical purposes, the above described equipment is mounted inside a housing that encloses it.

Further, a tray 426 is optionally installed on the lower part of the enclosure 42 and serves as a collector of the liquid bulk, while an upper protection 425 serves as a guard to projections of liquid caused by compressed air, such that the upper protection may further comprise a tube serving as an obstacle to liquid particles and to the sound, while letting air pass through.

Drainage of liquid from the bottom of the tray 426 can be made directly to a solvent recovery area or it can be recycled back to the drawing tank 410 with the aid of a pump. The advantage of the latter configuration is that the tank 410 will always have a level that tends to be greater than the level of a drain. If the liquid accumulated on the bottom of the tray of the pre-recovery enclosure is directly conveyed to the solvent recovery area, a liquid feeding device must be installed on the drawing tank, ensuring replacement of the liquid medium lost by dragging of the yarn that is drawn and enters the pre-recovery enclosure.

Optionally, if one desires to completely isolate the interior of the enclosure 42, a Foulard rubber roll device 423 can be used. Using these devices aids in retaining liquid, in addition to isolating the enclosure. However, to ensure that no damages are made to the yarn, a low closure pressure should be used together with low hardness rubbers.

For the purposes of providing hearing comfort, the housing can be optionally insulated with any sound insulation elements.

In the present context, it is important to define the meaning of free liquid volume onto the surface of the filament. The gel yarn is characterized by a porous structure (very similar to a sponge when seen in cross section) containing a large volume of liquid (first solvent). When the gel yarn is formed, part of the volume of oil is expelled to the yarn surface. If a segment of gel yarn is let to rest with fixed ends, part of the oil will run off on the yarn under the action of gravity and part of the oil will remain inside the pores in an "stable" manner, being held capillarity forces. Based on this phenomenon, we will define hereinafter that the free liquid volume is all the volumetric fraction that can be retained or recovered by a certain mechanical principle.

On the other hand, the stable volumetric fraction is defined as the volumetric fraction that cannot be recovered by such a mechanical action, provided that the mechanical forces involved do not overcome the capillarity forces. Another important aspect is that liquid exudation caused by a deformation made while drawing the gel yarn is meant to be a consequence of the anisotropy given by the orientation. In other words, the crystallization to which the polymer is subjected while being drawn, associated with a change in the aspect ratio of the pores under the action of the same deformation, is responsible for transforming the stable liquid volume into a free liquid volume. Thus, a major part of this phenomenon would take place in the drawing bath.

However, experimental data show that oil exudation by the pores of the gel yarn is a slow method as compared to the average residence time in the bath and in the first pre-recovery enclosure. In other words, after deformation is determined, a certain period of time is required for a corresponding portion of the stable volume to exudate, transforming into the free portion, such that it can be retained by compressed air blades. In a continuous regimen, this is a problem because while a higher draw ratio in the bath allows for a greater displacement of the stable portion to the free portion, the same increase imposes a higher speed of the yarn along the internal path of the first pre-recovery enclosure 42, reducing proportionately the residence time for the air blades to be able to work. Such a loss in efficiency with the increase in the draw ratio would lead to a proportional increase in the residence time, which would increase the cost in equipment.

However, experiments have also shown that withdrawal of the free oil by the air blades is a fast method as compared with the exudation time. In other words, to simply increase the path of the yarn in the first pre-recovery enclosure would not be the most efficient manner to improve retention efficiency, since the cost of the equipment and the consumption of compressed air would increase considerably.

Therefore, in order to increase efficiency of the pre-recovery unit with the least impact possible on the cost of the equipment, the idea of optionally adopting an accumulator 43 was conceived. In context of the present invention, accumulator 43 is any configuration of textile equipment capable of increasing the path of the yarn in the most compact manner possible, for the time required for the exudation method to occur.

In the optional configuration disclosed, the accumulator 43 comprises two columns of idlers or rolls that can conduct the yarn so as to prevent the occurrence of damages or titer oscillations. Adjustment in the residence time is carried out by the number of "zig-zag" turns and by the distance. Rolls or idlers can be free or motor-driven. Conceptually, the use of a powered transport system would not be required, since the two pre-recovery enclosures 42,44 would serve to guide the yarn. However, to prevent that friction variations on the roll or idler axes can cause titer instabilities in the gel yarn, a powered configuration can be optionally adopted. In addition, such a powered drawing device can be designed such that an elevation gradient can be provided along the yarn path. This would allow for a small stretch to be made in the accumulator 43, thereby preventing any degree of relaxation of the gel yarn along the path.

The fifth and last part of the pre-recuperator unit is the second pre-recovery enclosure 44. The description of the second pre-recovery enclosure 44 is the same as the first, as described above, such that the second enclosure serves to retain the first solvent exuded along the path of the accumulator.

Conceptually, any liquid may be utilized as a drawing medium in the drawing tank 410. However, in the scope of the present invention, the liquid itself used as the first solvent or water are preferably adopted. However, any other liquid other than those mentioned above may adversely affect the method, since other separation operations must be used, then burdening the solvent recovery area.

When the liquid itself used as first solvent is used as a thermal transfer medium in the drawing tank 410, a small pre-recovery enclosure (not shown) can be adapted on the feed tower to retain the water dragged from the quenching bath. Experience acquired from experiments using air blades has shown that the water dragged by the wire exiting the quenching bath is relatively easy to retain. Water forms small drops on the gel yarn surface, being very exposed to the action of air streams.

In practice, the choice of the liquid used in the tank will depend on the drawing temperature. When the desired work temperature range is between room temperature and 80° C., water is the preferred liquid in the scope of the present invention. The gel yarn has a high amorphous fraction, which enables high draw ratios to be obtained at a temperature of less than 80° C. On the other hand, the draw ratio is limited by the low motion of the chains in the crystalline phase. The use of temperatures of greater than 80° C., achieved by using mineral oil as a thermal medium, makes it possible to obtain high draw ratios with no damage to the microstructure of the gel yarn and, as a result, obtaining high pre-recovery index values. In this context, the draw ratio applied to the gel yarn must be greater than 1.5:1, preferably greater than 5:1 and more preferably, greater than 8:1.

While the use of high draw ratios in the gel yarn is beneficial for high fractions of free oil to be obtained, efficiency of pre-recuperators is very reduced by decreasing the residence time (increased speeds). To compensate for that, all the features of the pre-recovery enclosure 42,44 must be optimized. The number of sets of air blades 421, 441 must be increased at the same proportion as the draw ratio applied to the gel yarn. In context of the present invention, the number of sets of air 421, 441 blades must be higher than 1, preferably higher than 4, more preferably higher than 6. Preferably, the number of sets of air blades 421, 441 per roll 420, 440 must be equal to 1. However, a greater number can be used. The distance between the air blade 421, 422 and the surface of the roll 420, 440 must be adjusted as a function of the compressed air pressure used. Very high pressures associated with small distances are limited by the entanglement of the yarns and even by the displacement of the path thereof on the roll perimeter 420, 440. In context of the present invention, the distance between the air blade-generating device 421, 441 and the surface of the roll 420, 440 must be lower than 60 mm, preferably lower than 40 mm, more preferably lower than 20 mm. Pressure used in the air blade-generating device 421, 441 depends on the device used. However, the used pressure must be limited by the entanglement of the yarn or by another instability that can cause any damages to the yarn or any processability problems in the spinline. There are many ways to position the air blade 421, 441 relative to the yarn. In context of the present invention, the preferable positioning is such that flowlines of the air blade 421, 441 are directed away from the motion of the yarn and are tangential to the roll surface.

Using textile features to accumulate yarns 43 between the two pre-recovery enclosures 42,44 is the key factor in the efficiency of the pre-recovery unit 4. If a textile configuration is used as shown in FIG. 3, the distance and the number of zig-zags must be adjusted such that a residence time of greater than 0.5 minute is achieved, preferably a residence time of greater than 1 minute and more preferably greater than 2 minutes will be sufficient for the major part of the stable oil to be transformed into free oil.

In context of the present invention, preferably, rolls or idlers used in the accumulator columns move independently from each other, that is, the use of powered mechanical devices is preferred. When such a configuration is used, the ratio of the speeds of the rolls must be adjusted so as a global draw in the accumulator of greater than 1.05, preferably greater than 1.1 and more preferably greater than 1.2 is applied. For no damages to occur in the yarn microstructure, a global draw ratio in the accumulator must be of less than 5, preferably of less than 3 and more preferably of less than 1.5.

Therefore, the pre-recovery system now described optionally comprises:

a) a tower of feed rolls 40 where the number of rolls 401 is sufficient to prevent slippage of the yarns, wherein, optionally, the tower 40 may contain a liquid retaining device 402 and a first solvent which are occasionally dragged from the quenching bath 30, and wherein, to prevent loss of solvents and water, a collecting tray can be placed below the rolls;

b) a drawing tank comprising 41 a liquid medium serving to transfer heat to the yarn and to collect the volumetric fraction of the first solvent exuded during the residence time in the tank 410, wherein said tank 410 contains a system of immersion rolls 411 to facilitate passage of the yarns, wherein the tank can also comprise a liquid circulation pump contained in the tank, a heat exchanger, a drain and a lid 412, such that, when the liquid used is the first solvent itself, an inert gas feeding device may be used to prevent degradation of the liquid.

c) a first pre-recovery enclosure 42 optionally comprising:
a second roll tower 420 or a yarn accumulator serving to draw the gel yarn while it passes through the drawing tank 410, such that drawing is given by the difference in the speeds between towers 40,42;
air flow generating devices 421, such as air blade devices, where compressed air is used to retain the volumetric fraction of the first solvent that is available in the free form, on the filament surfaces of the yarns, while they are transported by the rolls of the second tower 42, such that these devices are preferably directed away from the motion of the yarns and such that the air blade is tangential to the roll surface;
scraper devices 422 duly coupled to the tower rolls 420, serving to retain liquid adhered to the surface of the rolls 420, preventing them from wetting the yarns;
an external environment-insulating case or housing 425, comprising walls with some sound-absorbing features, a liquid collecting tray 426 positioned below the rolls and an air exhaustion tube installed on the top of the enclosure 42, which can contain elements that retain liquid and sound particles;

d) a yarn accumulator 43 optionally comprising two roll towers 430 where the yarns can travel a "zig-zag" path in order to maintain the yarn for a period of time sufficient for the first solvent to exudate, being available at the surfaces of the yarn filaments;

e) a second pre-recovery enclosure 44, preferably comprising features similar to those of the first 42 pre-recovery enclosure, however, due to a possible increase in the speeds in the previous steps, the second enclosure may comprise a higher number of air blade generating devices 441.

Furthermore, according to the optional configuration described herein, the pre-recuperator now proposed optionally comprises:

a) a pre-recovery index expressing the fraction of the first solvent retained by the pre-recuperator 44 and which will not contact the second solvent in the extraction step, wherein the pre-recovery index is greater than 20%, preferably greater than 50% and more preferably greater than 70%;

b) drawing in a liquid medium, which takes place between the first two roll towers of the pre-recuperator, while the yarn is submersed in the tank, characterized by a draw ratio applied to the gel yarn that is greater than 1.5:1, preferably greater than 5:1 and more preferably greater than 8:1;

c) drawing in liquid medium, which takes place between the first two roll towers of the pre-recuperator, while the yarn is submersed in the tank, wherein: a temperature between room temperature and 80° C. is adopted when water is used as a drawing medium in a liquid bath; and a temperature greater than 80° C. is adopted when the first solvent itself is used as a drawing medium in a liquid bath, while a draw ratio greater than 8:1 is applied to the gel yarn;

d) a residence time in the yarn accumulator of greater than 0.5 minute, preferably, a residence time of greater than 1 minute and more preferably greater than 2 minutes, which will allow for a fraction of stable volume to be transformed into free volume, and can also be retained in the second pre-recovery enclosure.

It is then clear that retention of the higher amount possible of the first solvent, ensured by the optional configuration of the proposed pre-recuperator, represents a great technical and economic advantage over the state of the art. However, recovering in an efficient manner the larger volume possible of the first solvent prior to feeding the extractors is not the only advantage described by the present invention.

To render the mineral oil based technology even more competitive than the decalin based technology, when all the aforementioned aspects are taken into account, it is also interesting to develop concepts related to a greater efficiency of the extractors 50. Therefore, the present invention further discloses an extractor 50 with an advantageous construction feature, as will be discussed below.

Figure 4:
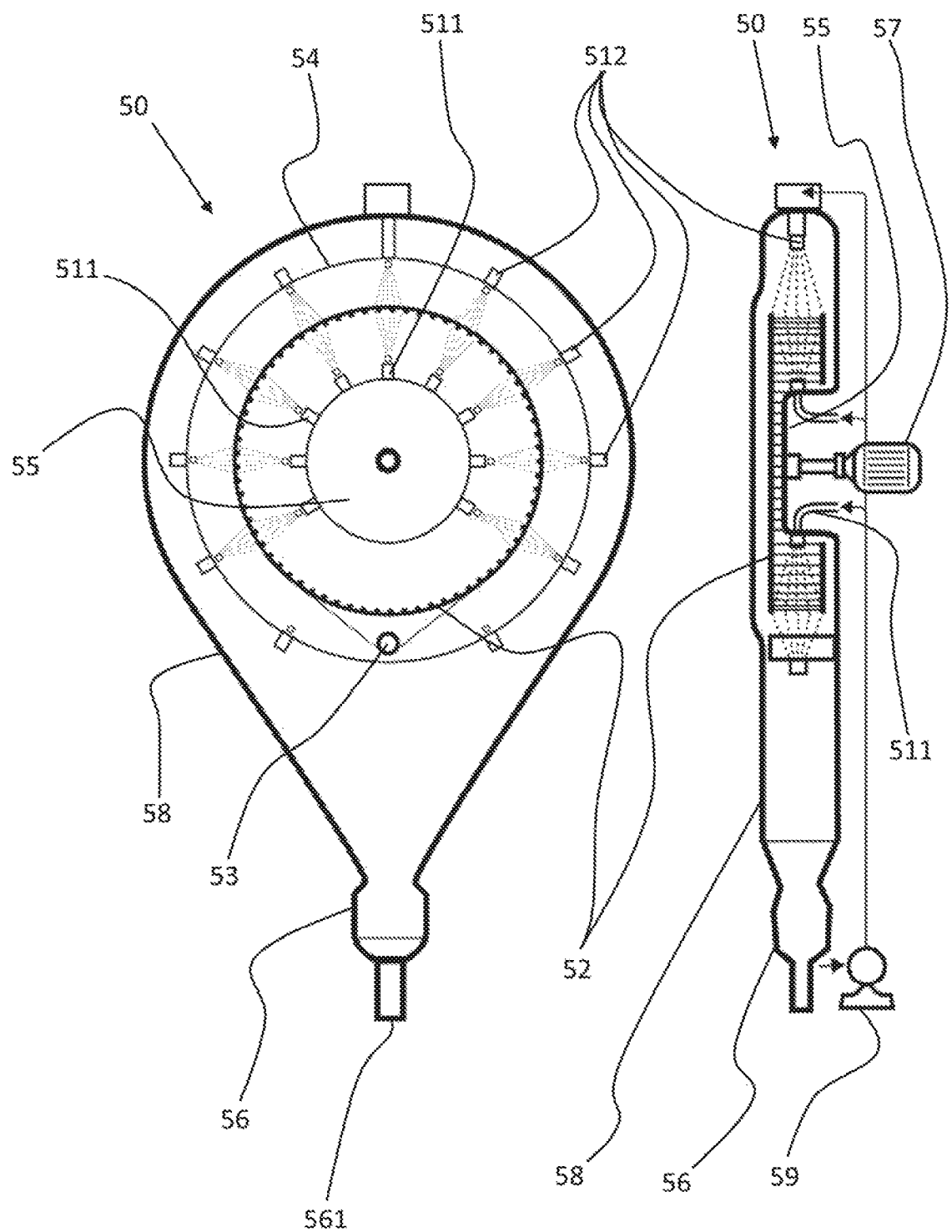
FIG. 4 illustrates a front view and a side view of a washing device for a polymeric yarn in accordance with an optional configuration of the present invention.

FIG. 4 illustrates an extractor 50, in accordance with an optional configuration of the present invention, comprising a rotating member, optionally illustrated as a rotating drum 52, that follows the conduction rules in rolls used in drawing godets and dual-type rolls, commonly used in the textile industry. The physical principle used ensures that one can wind the yarn in the same roll 52 (main roll) several times in such a way that they do not touch and/or entangle with each other while being conducted. This is possible as an auxiliary member, optionally in the form of an auxiliary roll 53 of smaller diameter is used to separate the yarns by a distance that is a function of the relative angle between the shafts of the two rolls 52,53.

In context of the present invention, the main roll 52 will be hereinafter designated as drum 52. This designation is pertinent since the diameter thereof is larger than the diameter of the auxiliary roll. Such drum 52 has a rod crown 521 serving to carry the yarn while exposes the filaments thereof to two streams of washing liquid 512,511. When the yarns are produced continuously and when no twist operation is applied, the yarn filaments accommodate under ribbon shaped surfaces. In other words, the yarn filaments are arranged almost perfectly in parallel to each other. It causes the extraction liquid jets 511, 512 to reach the two larger faces of said ribbon, resulting in an effective contact.

Visually, when one yarn or a set of yarns is adjusted and conveyed over the drum 52 a web is formed, which is subjected to the action of jets 511, 512 on both sides. The relative angle between the drum axes 52 and the auxiliary member 53, the distance between them and the diameter ratio thereof define the spacing between the several yarns.

Using a structure with hollows, preferably rods 521, instead of a flat surface is one of the advantageous aspects of the drum 52 of the present invention related to the high efficiency of the described extractor 50. With such a configuration, the drum 52 may receive jets 511, 512 directed from both the internal and external faces. Thus, the yarn that naturally organizes itself in the form of a ribbon with filaments almost perfectly arranged side by side is subjected to an intense turbulent flow by the joint action of two jets arranged in opposite directions.

Using suitable liquid flow generating devices 511, 512, preferably jets, the extraction efficiency increases even more. Dispersing nozzles with jets of several geometric shapes can be used. There are commercial nozzles having a homogeneously intense jet along its geometric form, which is ideal to be adapted over the entire surface of the drum 52, both external and internal. Due to the geometric shape of the drum 52, square or rectangular jets are preferred.

The auxiliary member 53, in turn, has its axis attached to a mechanical angle adjusting device, which can be adjusted even during operation in case the yarns wind in the drum 52. This adjustment is made by external regulation, not requiring opening the equipment's door nor interrupting the system operation.

For the purposes of the present invention, any device for changing the angle of the auxiliary roll can be used, provided that there is a proper sealing between the regulation and the internal portion of the extractor.

Optionally, the jets nozzles are externally supported by a circular support 54 or by the extractor case 58, and is internally supported by a fixed drum 55, which is a cylindrical structure that projects into the extractor. The drum can be moved by the movement of the yarns themselves that would then be conveyed by equipment before and after the extractors or can be moved by an independent motor 57 via a drive shaft.

Optionally, the independent motor-driven drum 57 is preferred, which provides some advantages such as better titer control and the possibility of applying drawing between extraction units when extractors 50 in series are used.

In the extractor dynamics, the gel yarn rich in the first solvent enters the first extractor 50 while the yarn rich in the second solvent exits the extractor.

Figure 5:
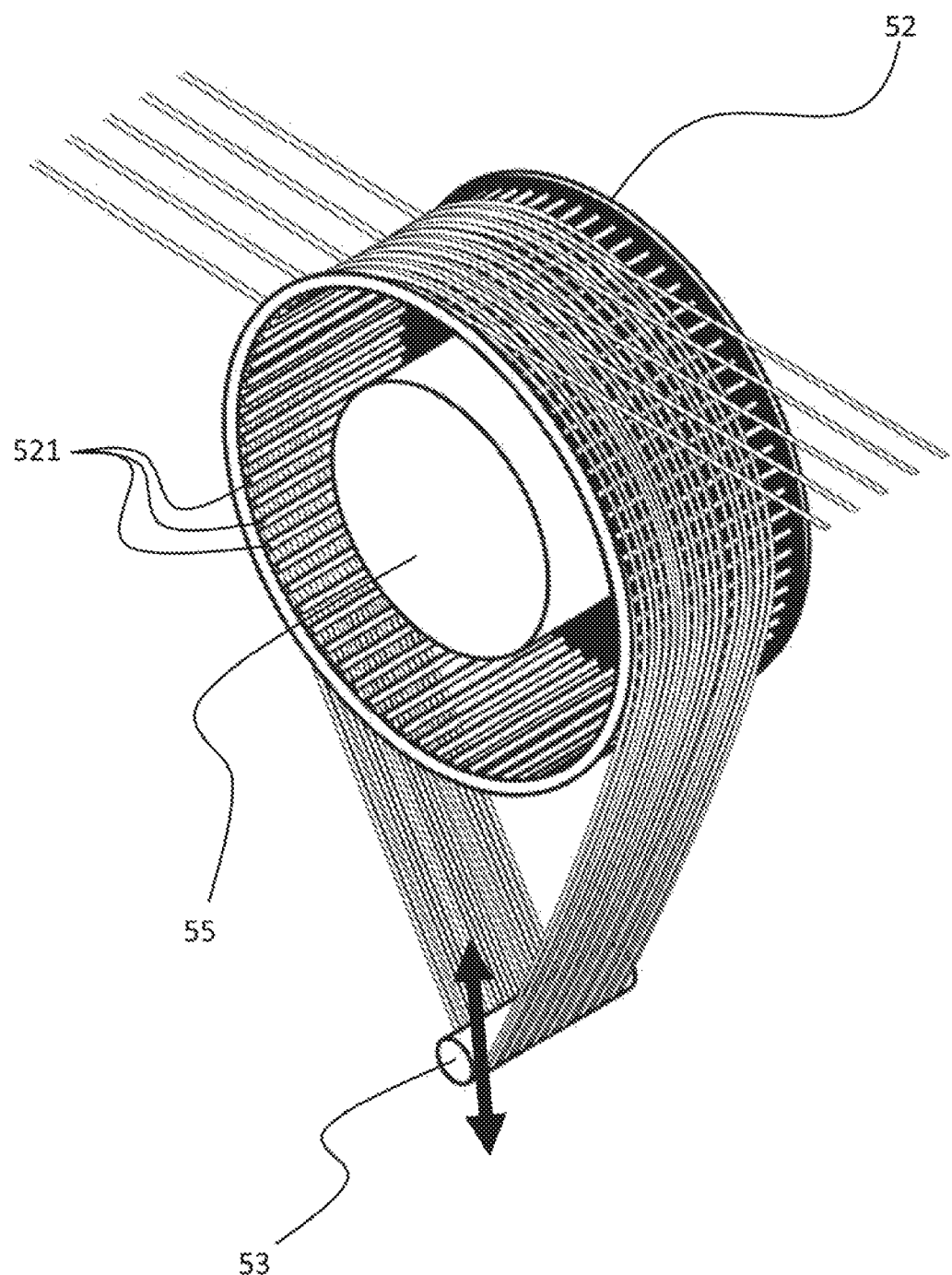
FIG. 5 illustrates an isolated view of a rotating member and an auxiliary member of the extraction device of FIG. 4.

FIG. 5 illustrates a representation of the perspective view of the optional configuration of the drum of the present invention, where five yarns are fed into the extractor 50 spanning the entire area thereof. Variables as drum diameter 52, distance between the drum 52 shafts and the auxiliary roll 53, number of turns of the yarn and tangential speed of the drum determine the contact time between the gel yarn and the washing liquid.

The contact time or residence time is another critical parameter that will be discussed below. For a better use of the extractor 50, the most number of turns as possible is given in the drum 52 area for each yarn. This is made possible by optimizing the angle ratio between the drum 52 and the auxiliary roll 53.

In order to provide the greatest positioning stability of the yarn on the drum and auxiliary roll surfaces, optionally one can use auxiliary positioning devices. Optionally, comb-type spacers can be used in the path of the yarn bundle located between the drum 52 and the auxiliary roll 53. The comb spacing determines the number of turns of the yarn in the drum and helps in stabilizing transportation, working together with the auxiliary roll. The number of combs, the position and the positioning angle thereof are irrelevant, but can be optimized for the frequency of windings to be maximally minimized.

The yarn transport mechanism used in the present invention allows the extractor 50 not to lose efficiency with the increased speed caused by drawing performed in steps prior to the extraction step. This is possible because while the draw ratio is increased in the previous steps, which increases the speed in the extraction unit, the yarn occupancy width on the drum 50 reduces proportionately. In the context of the present invention, occupancy width is defined by the width of the drum occupied by each turn of the yarn. That is, the greater the draw ratio applied to the yarn in any previous step, the higher the speed of the yarn in the extractor, but the lower its occupancy area by allowing a greater number of turns to be given for each wire. That is, the greater number of turns compensates the increased speed. Therefore, the contact time between the yarn and the second solvent applied by the washing liquid delivery devices 511, 512 will be maintained almost constant. Unlike other yarn extractors used in the spinning gel method of the state of the art, the extractor described in the present invention allows for a great versatility of the method without the requirement to add extraction units to ensure complete removal of the first solvent in the output of the extraction unit.

Optionally, the extraction system is isolated from the external environment by a protective wrap 58, or case, by an access port (not shown) and a mechanical seal mechanism at the entry and exit points of the yarns. Geometry of the case 58 can be optimized such that the internal volume will be only that which is strictly necessary to accommodate the drum 52 and the washing liquid delivery devices 511, 512. Both the case 58 and the port are sealed so that no liquid or steam emanates out of the extractor 50 and are sized to withstand the operating pressure.

A critical aspect of the oil based spinning gel method is that solvents used in the extraction usually have high vapor pressure. Use of these solvents enables drying of the yarn to be made at temperatures well below the softening temperature of the xerogel yarn. While drying is facilitated by the use of high vapor pressure liquids, the extraction step becomes a point of high solvent evaporation rate. And if a good insulation system is not used, a large amount of the second solvent will be lost at this step, which, in addition to the operational cost issues, prejudices health- and environmental-related aspects.

Therefore, complete isolation of the case 58 as well as the possibility of pressurization is an important optional feature of the extractor device 50 of the present invention, and can be achieved by using sealing devices or mechanical seals at the entry and exit points of the yarn 443. Any device that isolates the interior of the enclosure from the external environment can be used. However, in context of the present invention, Foulard devices especially designed for complete seal are preferred.

Figure 6:
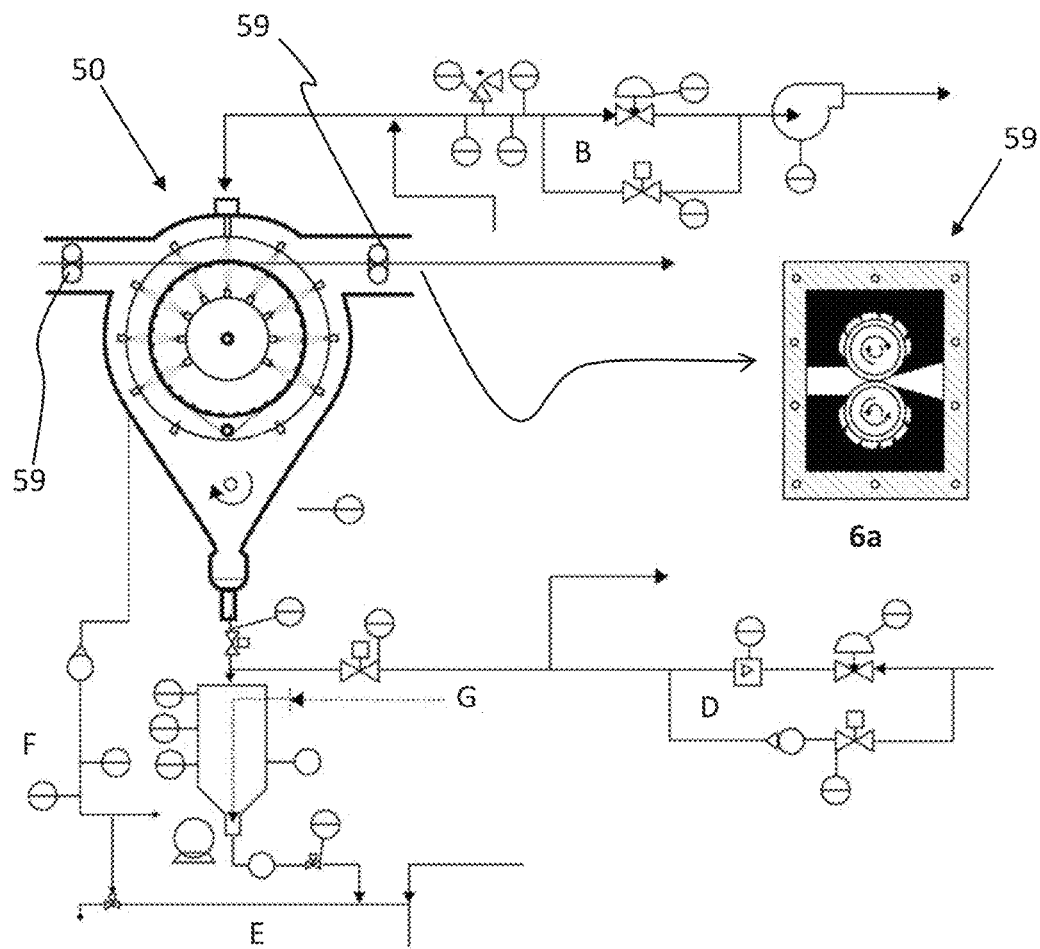
FIG. 6 illustrates an schematic configuration of a circuitry optionally comprised in the extractor device of FIG. 4.

FIG. 6 is a diagram containing an example of an optional configuration of valves and instruments used so that the extractor described by the present invention can operate using any volatile and flammable solvent in a safe and sealed manner. FIG. 6a shows the extractor case containing all the yarn transporting and sealing mechanisms.

FIG. 6, in particular detail 6a, illustrates an optional configuration of a sealing device for an extractor provided by the present invention wherein the mechanical seal shown is formed by the yarn entry cavity, outlet cavity, rolls consisting of a metallic shaft, roll rubber and internal sealing rubber. The roll rubber optionally has low stiffness for any damage to occur to the yarn. One can optimize the roll rubber part using rubbers that are more resistant to friction in the ends together with a soft rubber in the center where the yarn passes. It reduces the maintenance cost of this type of device. The rubber comprising the inner seal may be composed of high friction strength rubber. All the elastomeric material used must withstand the continuous action of liquids used as the first and second solvents.

Movement of the rolls should be ensured by a precise mechanism so that the tangential speed of the two rolls is equal to, or slightly smaller than the yarn speed in the first extractor drum and equal to or slightly greater than the drum speed of the last extractor. It can be done by using an independent motor or by using the same mechanical system that drives the drum.

As already shown, Foulard-type devices are preferred in the present invention as they withstand high pressures and exhibit great sealing, preventing vapors to be released to the industrial environment.

In the lower portion of each extractor, a collecting vessel 56, also designated extractor vessel, is optionally installed, which functions to collect all the liquid projected by the washing liquid delivery devices 511, 512, after contacting the yarns, to provide feedback to the internal circulation system. To compose the internal circulation circuit, a pump sucks the liquid from the vessel 56 and pressurizes a feed manifold of the internal 511 and external 512 nozzles through a tube.

In order to control the washing temperature, a heat exchanger (not shown) is optionally used for removing or providing heat to (or heating or cooling) the circulating fluid (second solvent) in relation to the extractor equilibrium temperature.

The circulation flow rate is another relevant aspect to the efficiency of the extractor 50 of the present invention. Injection of clean solvent is made by any liquid metering pump, provided that there is a good flow rate control between the reservoir and the interior of the extractor. Also, for a good utilization of clean solvent to ensure that the same contacts the yarns, the internal circulation pump is preferably positioned at a point below the extractor vessel.

In turn, disposal of spent solvent is done by any device consisting of valve and a level control. That is, the spent solvent disposal valve opens whenever a certain level is reached in the vessel. For definition purposes, in the context of the present invention, clean solvent is all liquid used as the second solvent with low or no content of the first solvent, whereas spent solvent is the liquid used as the second solvent and having a higher concentration of the first solvent than the concentration thereof in the so called clean solvent. Disposal point of the spent solvent is not critical. However, in order to prevent build-up or any dead spots, the disposal point is preferably located in a lower portion extractor vessel 56.

A discharge valve is also optionally installed in the bottom of the extractor vessel 56, being activated each time the level sensor is actuated. Any level control device may be used.

Detail B of FIG. 6 presents a diagram of a skid containing a set of valves and instruments serving to, along with the inert gas supply skid (detail D), purge the extractor such that all oxygen from the air is fully expelled and to maintain the desired pressure for operation of the unit. The skid contains a reliable device for measuring the oxygen content, so that an adequate intake of inert gas is used to ensure inertization of the interior of the extractor. The skid should, however, have a set of valves such that a high and low flow rate can be adjusted. High flow rate serves to purge the extractor, at the machine startup or every time the port is opened. In turn, the low flow rate functions to enable small reliefs of pressure when the internal pressure of the extractor reaches a critical value.

The skid is adapted at the top of the extractor such that any solvent in liquid form enters the tubing. The skid outlet pipe can be connected to an exhaustion line or connected to the solvent recovery area. For the purposes of reducing the solvent emanation rate to the environment, it is preferred to send the gases and vapors to the solvent recovery area.

Detail D of FIG. 6 shows a diagram of an inert gas supply skid that can be used in the present invention and functions to feed inert gas to the extractor. The set of valves and instruments allows one to feed inert gas in high flow rate during the purge step, or in a low flow rate of inert gas during operation in order to replenish any losses caused by leakage, keeping the internal pressure at a given constant target value. The high flow rate line acts at the time of purging, every time the port is opened or every time the oxygen content reaches a critical value for safety of the equipment.

Additionally, a low flow rate meter can be used to monitor for possible leaks in the extractor 50. Monitoring this flow rate allows for interrupting the system operation for maintenance purposes, ensuring that the environment is not contaminated by solvent vapors.

Detail F of FIG. 6 shows the internal circulation diagram, as described above, comprising the vessel, the internal circulation pump, the heat exchanger (not shown) and feed manifold of washing nozzles, together with its valves and control instruments.

Detail E of FIG. 6 shows a diagram of the spent solvent disposal skid. The skid has a set of valves and control instruments that allow for the volume of solvents contained inside the extractor to be rapidly eliminated in case of emergency, as well as a set of valves and instruments having the function to maintain the level of the circulation vessel constant.

Detail G of FIG. 6 shows the clean solvent supply line in the suction of the internal circulation pump, as described above.

In order to reduce consumption of clean extraction solvent, the extractor described in the present invention can optionally be associated with others in a serial configuration. When the extractor described in the present invention is mounted in a serial configuration, the yarn fed into the first extractor passes to the other ones through a conducting channel adapted at the Foulard position. Foulard-type devices can be used to fully isolate one unit from the other. However, in order to prevent excessive deformation of the yarn, a conducting channel, having an inclined plane on its bottom, is preferred. The inclined plane has the function to cause any excess of spent solvent falling from the yarn to be always kept in the dirtiest (previous) unit.

Feed of clean solvent is preferably made in the last unit, where the yarn has the lowest content possible of the first solvent.

In the optional configuration in series, transfer of waste liquid can be done via a dosing pump installed between the units, or simply by a cascade-type overflow. Liquid flow between the cascade-type overflow units takes place using drains joining the circulation vessels. In these drains, the liquid flows by gravity from one vessel to the other by a difference in height relative to the ground. In this configuration, the cleaner liquid moves by overflowing, always towards the dirtier unit, in countercurrent to the direction of the yarn, which moves from the dirtier to cleaner unit. The difference in height between the drains ensures that no liquid from the dirtier unit goes to the cleaner unit. In the context of the present invention, the cascade-type configuration is preferred. It reduces the equipment costs and simplifies the method of fluid transportation.

In the optional serial configuration illustrated in detail E of FIG. 6, the disposal skid is installed on the first unit (richer in the first solvent), ensuring that the liquid inventory inside all the extractors remains constant. To ensure that the inventory is quickly discharged in case of an emergency, high flow rate discharge valves can be installed in all units. In a normal operation situation, then, the clean solvent feed flow rate fed into the last unit is almost equal to the spent solvent flow rate discharged in the first unit, provided there is no loss of solvent by evaporation.

The inert gas supply skid for purging and controlling pressure, as described (detail D, FIG. 6) as well as the skid for purging and controlling the top pressure (detail B, FIG. 6) are equally connected to all units so as to ensure that oxygen is not at any dead spot of the serial units.

As will be discussed below, the use of extractors in series is intended to decrease the consumption of clean solvent. At a balancing stage of the method, a concentration gradient of the first solvent will be formed between the first and the last extractors. The number of extractors used will then be the result of a cost/benefit ratio between the capital expenditure, added per each added unit, to the reduction of the cost of solvent separation operation in the solvent recovery unit.

There is also a possible decrease of investment in the solvent recovery unit with the increased number of extractor units, by reducing the volume of the tanks and distillation and purification columns. This reduction takes place because the mixture volume (first+second solvents) is reduced by increasing the number of extraction units, by reducing the volume of the second solvent (the disposal solution of the first unit gets more concentrated in the second solvent as the number of serial units increases). The number of extraction units, in series, is a function of variables such as the maximum estimated speed after the pre-recuperator, the linear density of the yarn in the feed, the number of yarns, the number of filaments per yarn, the occupancy width of the yarn in the drum and the efficiency to be considered at each step.

It is important to emphasize that when the first non-volatile solvent at normal method conditions (dissolution temperature between 150° C. and 310° C.) is a hydrocarbon, second solvents such as hydrocarbons, chlorinated hydrocarbons, chlorofluorocarbons and other organic solvents such as diethyl ether and dioxane as well as a mixture/combination thereof can be used. In context of the present invention, low boiling point hydrocarbons are preferred. Non organo-halogenated solvents with boiling points of less than 80° C., preferably less than 70° C. are preferred. Organo-halogenated solvents have good dissolution performance, low boiling points and are not flammable.

Therefore, the method for the extraction of porous yarns of the present invention is based on the substitution of the first solvent with the second solvent, which takes place by the gradual dissolution of the first solvent by the second solvent in the extractor. In this context, the extraction system can be divided into two liquid phases. The first liquid phase is the phase delimited by the surface of the yarn filaments, i.e., the liquid phase contained inside the pores and on the outer surface of the yarn filaments. The second liquid phase is the liquid medium external to the yarn, i.e. the phase formed by liquid surrounding the extractor. When a gel yarn segment contacts a certain volume of extraction solvent there will be a gradual dissolution of the first solvent. Over time, the concentration of the first solvent in both phases tends to be the same. For example, solvents such as n-hexane are fully miscible with mineral oil at any proportion. However, there is an issue of dissolution kinetics, since for the complete mixture to occur, the second solvent must permeate the porous structure, where there are interactions with the polymer surface, making the method difficult. Generally, this dissolution kinetics is dependent upon factors such as temperature and the level of turbulence.

To describe the performance of a particular extractor, contact parameters between the two phases described above must be taken into account. The science related to the extraction unit operation is broad, where many variables are involved. However, in the context of the present invention, aspects related to contact of the two phases will be discussed. The extractor efficiency is therefore dependent on: (i) the contact time between phases, (ii) the contact temperature and (iii) the contact efficiency.

The contact time between the phases, or simply the residence time of the yarn inside the extractor, is dependent upon geometric factors as well as the yarn speed. Geometric variables of the extractor define the path traveled by a yarn segment inside the extractor and which will be in contact with the liquid extraction medium. The perimeter of each turn is a function of the drum diameter, the auxiliary roll diameter and the distance between the drum and the auxiliary drum shafts. In turn, the number of turns of each wire on the drum will be, in the present context, the largest number possible. After defining the maximum width available for each yarn, the number of turns is defined by the occupancy width of the yarn on the drum and the minimum spacing for a low probability of entanglement during the extraction operation. The occupancy width is dependent on the number of yarn filaments, the yarn titer, the oil content present in the yarn, and so on.

Figure 7:
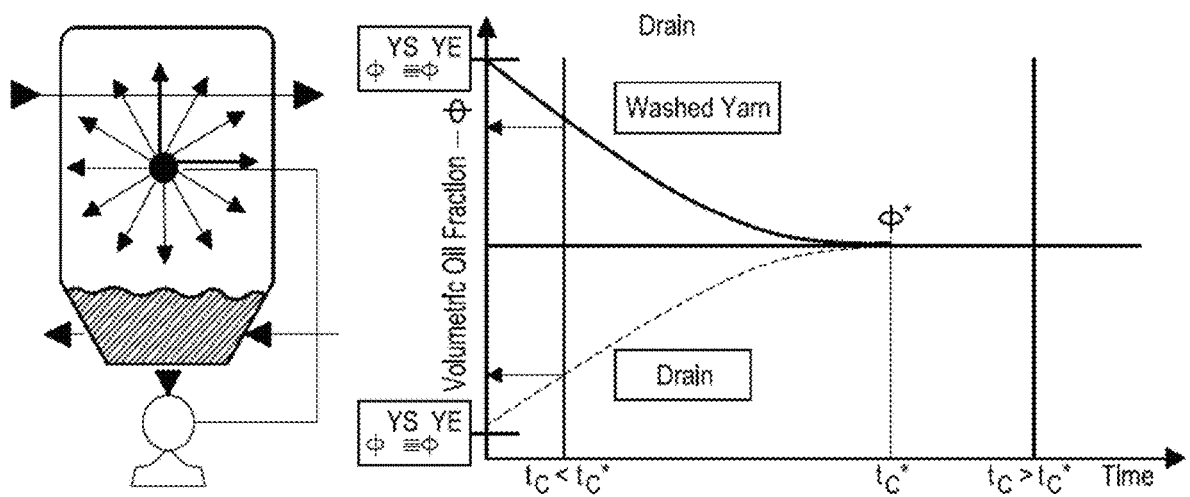
FIG. 7 discloses a diagram showing the yarn and solvent flows and a chart illustrating the volumetric compositions of both solvents over time.

FIG. 7 shows a conceptual diagram of the composition of the first solvent in the two phases involved with the contact time in the extractor. In such a diagram, one notes that the contact time is equal to zero, the liquid phase contained in the pores of the yarn is completely filled with the first solvent. At this moment, the first solvent composition, at this phase, is equal to 1. The phase formed by the volume of extraction liquid (second solvent) inside extractor is in turn practically comprised by neat solvent and the first solvent composition at this phase is equal to 0.

With the contact time, the composition of first solvent of the surrounding phase begins to increase, whereas the composition thereof in the yarn phase begins to reduce. If there is enough time for this to take place, the two phases will converge to same composition. In the context of the present invention, the second solvent is deemed to be dissolution solvent, whereas the first solvent will be treated as the solute in the dissolution. The time at which the composition of first solvent (solute) is equal in both phases is deemed the critical contact time ($t_c^*$) and the composition of first solvent in the mixture is designated critical composition ($\varphi^*$).

When the yarn contact time inside the extractor is less than the critical time, the first solvent composition in both phases can be described by the partition coefficient ($P_n$) and is given by equation 1, where n represents the number of the extractor where analysis is being made. The partition coefficient is useful to define the composition of the first solvent, in the yarn phase, in each extraction step and is obtained from the experimental curve described by the two curves shown in the conceptual figure (FIG. 7). The partition coefficient tends to 1 with the contact time. The experimental determination of the curves shown is important to define the operational parameters of the extractors as well as the efficiency thereof. Contact times greater than $t_c^*$ are not necessary, since no reduction in the first solvent composition will take place in the yarn phase from that point. In the context of the present invention, the yarn should remain inside each extraction unit for a time sufficient for the partition coefficient to reach a value greater than 0.5, preferably greater than 0.8.

$$Pn = \frac{\varphi_n^{surrounding\ phase}}{\varphi_n^{yarn\ phase}} \qquad \text{Equation (1)}$$

The critical contact time, defined as the moment when the first solvent composition reaches the same value in both liquid phases involved, can be used as a parameter for measuring the extractor's efficiency. That is, the lower the critical time reached for a given operation condition, the more efficient the extraction method. For the extractor described by the present invention, the critical contact time defined by $t_c^*$ is mainly influenced by the contact temperature and the contact efficiency. Naturally, the contact temperature follows the basic laws of organic solvent dissolution and should be as high as possible. Where the first solvent is mineral oil and the second solvent is, for example, n-hexane, the contact temperature should be greater than 10° C., preferably greater than 30° C., more preferably higher than 40° C. However, due to an excessive pressure inside the extractor, the temperature should be less than 60° C.

The other parameter that influences the critical time is the contact efficiency. In the context of the present invention, the contact efficiency is defined as the volumetric fraction of the total volume of surrounding liquid in the extractor, which actually comes into contact with the yarn filaments from the nozzle jets.

The volumetric fraction that circulates inside the extractor without contacting the yarn filaments should be as low as possible. To minimize this, a suitable directing of the nozzles should be done. Usually, the nozzles manufacturer defines the distances and directing angles. Another parameter related to the contact efficiency is the force exerted by the jet on the yarns. The force of the jets, regulated by the individual flow rate of each nozzle, is the variable that can be manipulated in the control of the force. The higher the force, the better the efficiency. However, the force will be limited by some damage or undesired displacement on the yarns on the drum.

The number of nozzles is another important parameter for efficiency. The greater number of nozzles, the greater the region of the drum that will be subjected to the action of the jet force. One way to quantify this is by the percentage of the total area of the drum which will undergo direct action of the bundle from the nozzle. In the context of the invention, the percentage of the total surface (inner and outer surface of the drum) must be greater than 50%, preferably greater than 80%. However, there is an economic factor that is related to the number of nozzles for achieving this percentage. The greater the number of nozzles, the greater the circulation flow rate and accordingly the sizing of the circulation pump. In the design of an industrial-sized unit, it significantly affects the capital expenditure in the extraction unit and a cost-effectiveness calculation should be done for one to arrive at optimal machine settings.

Further, besides the direct action of the contact force of the jets on the yarns, which results in an efficient level of turbulence that reduces the mixing time, the internal circulation flow rate is also an important parameter of solvent homogenization (first and second solvents). An internal circulation flow rate much greater than the extraction liquid feed flow rate is another important efficiency parameter in the context of the invention (equation 2). In an equilibrium stage, the first solvent composition in the volume of surrounding liquid should be as homogeneous as possible in all places of the extractor where the liquid circulates. In this context, the circulation flow rate has the same role as a stirring impeller in mixing vessel.

$$Q1 \gg Q2 \qquad \text{Equation 2:}$$

FIG. 7 further illustrates the diagram of the flow streams involved in the extraction method. Each meter of yarn inserts in the extractor a certain volume of solvent. This stream is defined by "v" and is equivalent to the flow rate designated herein as "linear drag flow rate", that is, the product of the yarn speed multiplied by the volume transported by one meter of yarn. Flow rate $Q_1$ is the circulation flow rate whereas $Q_2$ is the feed flow rate of the second solvent. Since the system works at a constant level, $Q_2$ is also the drain flow rate, provided that the amount of solvent lost by evaporation is not significant. In general, the yarn enters rich in the first solvent to the left and exits to the right rich in the second solvent. While the extraction solvent is fed on the opposite side to the yarn and exits rich in the first solvent to the left. The contact time of the yarn with the extraction fluid is given by the dimensions of the drum and the auxiliary drum, by the number of yarn turns in the drum and by the yarn speed. For a suitable efficiency to be achieved, equation 2 must be followed. It ensures that the concentrations of the internal phase of the pores tends to the concentration of external fluid.

Thus, in context of the present invention, the extractor disclosed herein optionally comprises at least one of:

a) a yarn transporting device comprising a main roll 52 and, optionally, an auxiliary roll 53, wherein, the main roll 52 comprises on its yarn conducting surface supports exposing both faces of the yarn web to the extraction liquid jets, and the auxiliary device 53, preferably an auxiliary roll that moves in the same tangential speed as the main roll, has an angle adjusting device such that one can regulate the spacing between the transported yarns preventing entanglement or to adjust the optimal spacing for a good use of the occupancy width of the yarns on the main roll;

b) a yarn transporting mechanism where a large number of turns can be provided, such that the residence time reduced by an increase in the speed caused by a modification in the draw ratio applied to the yarn in previous steps can be compensated;

c) a closed pumping circuit of the extraction liquid, where a pump connected to a container mounted on the bottom of the extractor forces the extraction liquid to come into contact with the yarn web;

d) a closed pumping circuit of the extraction liquid, where spray-type nozzles that project a jet in an homogeneous manner over the yarn web are used, wherein said jet has a suitable geometry such that most of the surrounding liquid contacts the web yarns;

e) a closed pumping circuit of the extraction liquid, having control of the circulation pump motor rotation, such that the circulation flow rate can be either increased or reduced to ensure that the force of the spray-type nozzles on the web yarns is suitable;

f) a closed pumping circuit of the extraction liquid, where a suitable number of nozzles 511, 512 is used such that the majority of the internal and external surface of the main roll is subjected to the action of the internal circulation jets of extraction liquid;

g) a closed pumping circuit of the extraction liquid, where a heat exchanger is used to transfer or remove heat from the surrounding liquid;

h) an insulation case 58 from the external environment, where a skid of valves and instruments is used to purge its inner atmosphere with an inert gas, whenever a flammable liquid is used as the second solvent in the extraction liquid, where a reliable instrument measures and monitors the oxygen concentration, so that the explosiveness of the internal atmosphere is null;

i) an insulation case from the external environment, where a skid of valves and instruments is used for a positive gauge pressure be set by using a constant feed of inert gas, wherein the pressure control can be adjusted so that the pressure is slightly above the vapor pressure of the extraction liquids, ensuring that the second solvent remains in the liquid state during the extraction operation;

j) an insulation case from the external environment containing a set of mechanical seal 59 at the inlet and outlet positions of the yarn in the extractor 50, such that a good seal under the yarn is provided without any damages caused by some kind of deformation occurring to the same;

l) an insulation case from the external environment containing a sealed port that opens and closes in a practical and safe manner exposing the yarns under the transportation rolls whenever an intervention is required;

m) a feed circuit of the second clean solvent that functions automatically with an extraction liquid disposal valve, rich in the first solvent, with the aid of a drain, so as to ensure that the volume of extraction liquid inside the extractor is almost always the same;

n) a circuit characterized by having a clean solvent feed dosing pump, where the injection point is mounted on the unit that is richer in the second solvent, wherein the circuit is further characterized by containing a an extraction liquid disposal drain mounted on the unit that is richer in the first solvent.

Furthermore, in context of the present invention, when a set of extractors is optionally adopted for the extractor to comprise multiple stages, the set of extractors comprises the following features:

a) it has a number of extraction stages where n units, as described above, are mounted in series, and where such a number of extraction stages is greater than one, preferably greater than three;

b) it has a set of n extraction stages, where the yarn rich in the first solvent is fed to the first extraction stage, while the yarn rich in the second solvent exits the nth extraction stage, wherein an extraction liquid rich in the second solvent is fed in the nth stage, while the extraction liquid rich in the first solvent is discarded in the first stage, such that when a set of extraction units is used, the extraction liquid stream moves, optionally by a cascade-type overflow, in a continuous stream that goes from the nth extractor to the first extractor, wherein such overflow takes place in pipes connecting the internal and circulation vessels of the extractors;

c) it has a contact time in each stage given by the dimensions of the transportation mechanism described above, such that there is a homogenization of the yarn and surrounding medium phases, such that a partitioning coefficient greater than 0.5, preferably greater than 0.8 is reached in each of the units;

d) it has an optimized contact efficiency in each stage to achieve the lower critical time (tc*) for each unit, such that:
the internal circulation flow rate (Q1) is greater than the feed flow rate (Q2) of the second solvent;
the number of jet nozzles of the spray type is used such that the area of action of the jets covers at least 50% of the total area (outer surface+inner surface of the web), preferably greater than 80% of the total area of the yarn web;

e) it has, by means of the heat exchanger, a regulated temperature control in all extraction units, such that the temperature is determined as a function of the boiling point of the liquid used as the second solvent, and should be as high as possible, such that the maximum working pressure of the extractors is not exceeded.

Thus, in accordance with the optional configuration of the present invention described so far when the yarn exits the extractors 50, almost the entire the volume of the first solvent is substituted with the second solvent. Subsequently, the gel yarn containing the less volatile solvent (second solvent) is then subjected to a drying process at a low temperature in order not to damage the microstructure thereof.

FIG. 1 further illustrates an optional configuration of a drying device 6, or dryer, which can be used according to the present invention. Any yarn, ribbon and/or fabric drying devices known in the state of the art can be used for the purposes of the present invention. However, in order to avoid variation in the titer or linear density of the yarn during drying, biased zig-zag conveyors in all the conveyor rollers and a precise stress control, wherein the conveyor rollers 61 can also be heated. Further, any homogenous heat source can be used, but heated inert gas forced circulation is optionally adopted.

Optionally, the drying device further comprises at least one dry gas inlet aperture and at least one wet gas outlet aperture, such that a gas is circulated in a closed-loop between the dryer 6 and the recovery units 5 of the second solvent.

When the yarn exits the drying unit, with practically no residue of the second solvent, it is designated xerogel yarn. Xerogel is a term used in sol-gel chemistry to describe a gelled structure that lost the liquid phase (dry gel).

The xerogel yarn is then continuously fed to at least one cold drawing roll tower 7, optionally two, as illustrated in FIG. 1. For the same reason as discussed for gel yarn drawing, it is economically interesting that the drawing portion can be cold, especially due to the orientation of the amorphous phase, provided that the limit of damage to the crystalline structure (that has no cold motility) is respected. However, this step is optional.

The pre-drawn xerogel yarn is then subjected to a hot draw process in a hot drawing device 8. It should be noted that hot drawing can be made in a single stage or multiple stages. Thus, the schematic illustration of components set out in FIG. 1 is intended to provide understanding on the method. Other types of ovens, rolls and drawing godets and types of ovens present in the state of the art can be used in the hot drawing of the method described in the present invention.

Finally, the yarn is wound on a winding unit 90. Between the end of the hot drawing and the beginning of winding, the yarn may receive any finishing used in the state of the art to provide the yarn with some improvement in its properties and processability in the final application. Any winding device disclosed in the state of the art can also be used to wind the yarn. Since the method is continuous, there is no limit to the weight of the bobbin in question.

For the purposes of reducing costs related to a drawing machine or to gain mechanical properties, the yarn obtained by the method described in the present invention can be drawn somewhere else where a drawing machine having suitable dimensions and length can be used. Where this type of configuration is used, the method of the present invention will be characterized as semi-continuous.

The figures and steps described herein are assumed in such a way for a better understanding of the ideas contained in the document, but can vary depending on the understanding of a skilled person.

Therefore, in summary, the present invention provides the following:

a system for dosing a polymer mixture with a first solvent in an extruder (26) comprising at least two inertization devices (21,22,23) comprising means for introducing an inertization gas flow, and that the at least two inertization devices (21,22,23) feed the extruder (26) with the inertized mixture, further comprising a feeding control device adapted to control the mixture level above the screw (261) of said extruder (26), such that rotation is sufficient not to segregate phases in the mixture;

a dosing method of a mixture with a first solvent in an extruder (26) comprising the steps of inertizing the mixture with an inertization gas flow in an inertization device (21,22,23) and feeding the extruder (26) with the inertized mixture, the method further comprising controlling the mixture level above the extruder screw.

a solvent extraction device of at least one polymeric yarn comprising a first solvent comprising: a rotating member (52) comprising a structure having hollows (521) in which the at least one polymeric yarn is externally wound at least one once; at least two extraction liquid delivery devices (511, 512), wherein at least one of the at least two washing liquid delivery devices (511, 512) is designed to deliver the washing liquid to the at least one polymeric yarn externally to the rotating member (52), and at least one of the at least two washing liquid delivery devices (511, 512) is designed para deliver the washing liquid in at least one polymeric yarn internally to the rotating member (52).

a method for mechanical pre-recovery of at least one liquid in at least one polymeric yarn, wherein the at least one liquid comprises at least one of a solvent and water, comprising the steps of: receiving a polymeric yarn from a quenching bath (30); and mechanically retaining at least one liquid of the polymeric yarn surface in a first pre-recovery enclosure (42).

a system for mechanical pre-recovery of at least one liquid in at least one polymeric yarn, wherein the at least one liquid comprises at least one of a solvent and water, comprising means for receiving a polymeric yarn from a quenching bath (30); and means for mechanically retaining at least one liquid of the polymeric yarn surface.

a method for the manufacture of at least one polymeric yarn comprising the steps of: mixing a polymer with a first solvent yielding a mixture; homogenizing the mixture; rendering the mixture inert; dipping the mixture into a quenching bath (30), wherein an air gap is maintained before the mixture reaches the quenching bath (30) liquid surface forming at least one polymeric yarn; drawing the at least one polymeric yarn at least once; washing the polymeric yarn with a second solvent that is more volatile than the first solvent; heating the at least one polymeric yarn; drawing at room temperature the at least one polymeric yarn at least once; and heat drawing the at least one polymeric yarn at least once.

a system for the manufacture of at least one polymeric yarn comprising: means for mixing a polymer with a first solvent yielding a mixture; means for homogenizing the mixture; means for rendering the mixture inert; means for dipping the mixture into a quenching bath (30), wherein an air gap is maintained before the mixture reaches the quenching bath (30) liquid surface forming at least one polymeric yarn; means for drawing the at least one polymeric yarn at least once; means for washing the at least one polymeric yarn with a second solvent that is more volatile than the first solvent; means for heating or cooling the at least one polymeric yarn; means for drawing at room temperature the at least one polymeric yarn at least once; and means for heat drawing the at least one polymeric yarn at least once.

Next, comparisons of the methods, systems and devices of the present invention and those known from the state of the art will be shown. Comparisons between the yarns produced by these processes will also be disclosed.

Example 1: Determining the Pre-Recovery Index by a Batch Method

A jacketed, stainless steel vessel, which contains a jet mixing circulation system, wherein a pump mounted to the lower part causes forced circulation of the suspension from the bottom to the top, was loaded with 7 kg of a suspension containing 8% Utec 3041 (a ultra-high molecular weight polyethylene manufactured by Braskem S.A.) in white mineral oil (Emca Plus 350 Oil, manufactured by Oxiteno). In order to reduce degradation, 500 ppm Irganox 168 and 500 ppm Irganox 1010 were added, based on the total weight of the mixture. The vessel was closed by a lid containing a stirring rod with five vanes having an impeller angle of 45°, arranged 90° with respect to each other. The set of vanes stirs the entire suspension column. A rotation of 350 rpm was set, while the jet mixing pump was regulated for the entire initial inventory to be renovated in approximately 1 minute. A nitrogen stream was adjusted on the bottom of the vessel such that the oxygen content, as measured by a sensor mounted to the bottom of the vessel, achieves values of less than 0.1 ppm in 40 minutes. After this time, the suspension was dosed to a 25 mm twin screw Haake extruder. Dosing was made by means of a vessel containing a level sensor installed in the feeding zone of the extruder. Level control was regulated such that the level of dosed suspension was roughly 10 mm above the screw. The dosage system is automated such that a low level signal is given to a gasket type valve present on the bottom of the suspension vessel, causing the same to open until a new signal of full level is sent by the extruder feeding vessel. This system ensures that only a sufficient amount of suspension is dosed to the extruder, preventing the existence of liquid columns with low level of agitation. A small column of suspension above the screw will be subjected to the agitation action of the screw itself. The temperature of the feed zone was maintained below 60° C. while dissolution was carried out at a temperature of 210° C. The spinning die containing a spinneret with 15 filaments of 0.5 mm in diameter was maintained at 190° C. The flow rate of the spinning pump was adjusted so as to achieve a mass flow rate of 0.6 g/min for each capillary. The filaments bundle passed through a 10 mm air gap and a water (quenching) bath at a temperature of 10° C. The yarn was then pulled by a spinning godet at a speed of 4.2 m/min and then wound using a Barmag winding machine in a plastic cartridge of known weight. A bobbin containing 1 hour spinning was collected and left to rest under a support such that the axis of the cartridge is at 90° with regard to the bench surface. Therefore, the oil exuded from the yarn can drain to a tray within a period of 48 hours. After this period, the bobbin was weighted. Three yarn segments were removed in different layers of the bobbin for analyzing the oil content by a Soxhlet extractor. Soxhlet extraction was carried out in accordance with Rule ASTM D 2257 using n-hexane as the extraction agent. In order to provide a comparative method, determination of the oil content by mass balance was also used. There was a suspicion that mineral oil would migrate to the surface of the bobbin over time, causing a concentration gradient, which could result in error. The total volume of mineral oil in the bobbin in one hour spinning can be calculated by the mass flow rate of the spinning pump, knowing that it contained 8% polymer. Based on the weight after 48 hours, the weight amount of pre-recovered oil could be determined. Based on this data, the pre-recovery index was then determined. As discussed above, the pre-recovery index is described by the percent mass or volume ratio of solvent transported by a certain length of the yarn that exits the pre-recuperator and the yarn entering the pre-recuperator. In the instant example, the pre-recuperator is defined as the support where the bobbin rests for a certain period of time, while the solvent is retained by the action of gravity (batch method). Then, after 48 hours of pre-recovery, a result of the pre-recovery index of 34% was obtained by Soxhlet, while a pre-recovery index of 24% was obtained by mass balance. These values will serve as comparative values with data obtained by pre-recovery in a continuous method. The procedure described herein was performed in accordance with U.S. Pat. No. 8,003,027B2, where a mineral oil-based method is described.

Example 2: Determining the Pre-Recovery Index by the Continuous Method Described in the Invention, without Using Drawing in a Liquid Bath and Only Using a Pre-Recovery Enclosure Another experiment was carried out using the same procedure as described in Comparative Example 1, but the yarn pulled by the spinning godet was fed to the feeding rolls of a drawing machine in liquid medium, which has a tank having 1.2 m in length, containing water at a temperature of 80° C. At the other end of the tank, a set of three rolls pushed the yarn fed to the first pre-recovery chamber. The draw ratio between the steps was 1.02 with the exception of the drawing in the tank, which was adjusted to 1.1. The first pre-recovery chamber contains a set of seven motorized rolls, where each roll has a compressed air flow generating device of the air blade type from Spraying System, with the air flow positioned in the opposite direction to the motion of the yarn and at a tangent position to the roll. Each roll has a rubber scraper to remove the amount of oil adhered to the roll surface. The distance of the air blade generating device to the roll surface was set to 35 mm. The air pressure in the feed manifold of the air blade generating devices was set to 5 bar. The Barmag winding machine was positioned after the first pre-recovery chamber to collect the yarn, in the same manner as the previous experiment. Bobbin samples were collected at each 30 minutes for assessing the oil content, by both Soxhlet and mass balance. The average pre-recovery index, as measured by Soxhlet, was 31%. While the average pre-recovery index, as measured by mass balance, was 23%.

Example 3: Determining the Pre-Recovery Index by the Continuous Method Described in the Invention Using Drawing in Liquid Bath and Using a Single Pre-Recovery Enclosure The same experiment carried out in comparative Example 1 was performed, but using higher stretches in the drawing machine in liquid medium. To the remaining steps, drawing was maintained with a low draw ratio of 1.02. Yarn samples were collected at each 30 minutes to determine the average index for each condition. To this experiment, only a Soxhlet analysis was used to determine the oil content. Results obtained to the experiments using draw ratios greater than 1.1, carried out in the drawing machine in liquid medium are shown in the Table I. For comparison purposes, the result obtained from the above examples were included.

TABLE I

| Experiment Name | Draw Rate | Pre-recovery Index (%) |
|---|---|---|
| Bath 48 hs | — | 34 |
| Continuous D.R. 1.1:1 | 1.1 | 31 |
| Continuous D.R. 2:1 | 2.0 | 14 |
| Continuous D.R. 3:1 | 3.0 | 19 |
| Continuous D.R. 5:1 | 5.0 | 34 |

Example 4: Determining the Pre-Recovery Index by the Batch Method Using Drawing in Liquid Bath and Using a Single Pre-Recovery Enclosure Bobbin collection samples at 1 hour under the same conditions as presented in Example 3 were left under the support on trays for 48 hours in the same manner as described in Comparative Example 1. The object of this Experiment was to determine the free oil fraction that cannot be retained or pre-recovered by the first pre-recovery chamber, by a continuous method, in the previous Experiment. However, to this Experiment, assessment of the oil content was made by mass balance. Results are set forth in Table II. Again, for comparative purposes, the results of the indices determined in comparative examples 1 and 2 were added to the table.

TABLE II

| Experiment Name | Draw Rate | Pre-recovery Index (%) |
|---|---|---|
| Bath 48 hs | — | 24 |
| Continuous D.R. 1.1:1 | 1.1 | 23 |
| Continuous D.R. 2:1 | 2.0 | 27 |
| Continuous D.R. 3:1 | 3.0 | 30 |
| Continuous D.R. 5:1 | 5.0 | 45 |

Example 5: Determining the Pre-Recovery Index by the Continuous Method Described in the Invention Using Drawing in Liquid Bath and Using Two Pre-Recovery Enclosures The present experiment was carried out under the same conditions as Example 3 but a second pre-recovery enclosure was used. The second pre-recovery enclosure was built just like the first pre-recovery enclosure, which was described in Comparative Example 2. To allow for a low exudation time to be given to the yarn, such that a stable oil fraction was transformed into free oil fraction, on the yarn surface, a distance of 4 meters was used between the two pre-recovery enclosures. Speeds of the two pre-recovery enclosures were adjusted such that a draw ratio of 1.2 was applied between them in order to maintain the adhesive strength of the inner rolls of both enclosures. For comparative purposes, new bobbins were generated under the same conditions as comparative examples 1 and 2. Barmag winding machine was then installed after the second pre-recovery enclosure. The oil content in the samples was determined by mass balance. Results are set forth in Table III.

TABLE III

| Experiment Name | Draw Rate | Pre-recovery Index (%) |
|---|---|---|
| Bath 48 hs | — | 20 |
| Continuous D.R. 1.1:1 | 1.1 | 24 |
| Continuous D.R. 2:1 | 2.0 | 27 |
| Continuous D.R. 3:1 | 3.0 | 27 |
| Continuous D.R. 5:1 | 5.0 | 38 |

Example 6: Determining the Influence of the Residence Time, Enabled by Using the Accumulator, on the Pre-Recovery Index by the Continuous Method Described in the Invention To determine the impact of the residence time between the two pre-recovery enclosures, two pulley bars were installed such that the yarn could increase its path between the enclosures. Due to the friction added per each pulley, the number of "zig-zag" turns was limited to five. Therefore, the path between the two pre-recovery enclosures increased from 4 m to about 20 m. A greater number of turns could not be made as the yarn started to fall from the latter roll of the first pre-recovery chamber. Most likely it was due to the friction of the set of pulleys, which reinforces the use of motorized roll towers on the accumulator. For this experiment, only larger draw ratios of 2.0 were applied. The experiment conditions were the same as applied to the experiment described in Example 5. Data is set forth in Table IV.

TABLE IV

| Experiment Name | Draw Rate | Pre-recovery Index (%) |
|---|---|---|
| Continuous D.R. 3:1 | 2.0 | 43 |
| Continuous D.R. 5:1 | 3.0 | 51 |
| Continuous D.R. 7:1 | 5.0 | 61 |

To better observe the influence of the residence time on the pre-recovery index, data of the draw ratio condition applied to the yarn in the drawing machine in liquid bath of 3.0 was used. The residence time was calculated as a function of the speed applied to the first pre-recovery chamber and the path of the yarn in the accumulator. For comparative purposes, results of the above experiments for a draw ratio condition of 3.0 were consolidated and shown in Table V.

TABLE V

| Experiment | Residence Time (min.) | Pre-recovery Index (%) |
|---|---|---|
| Ex. 3 | 0.00 | 19 |
| Ex. 5 | 0.22 | 27 |
| Ex. 6 | 1.12 | 43 |

Example 7: Assessment of the Product Produced by the Continuous Method Described by the Invention, Until the Pre-Recovery Step For the purposes of assessing the impact of using the pre-recovery operation on the mechanical properties of the yarn, a series of bobbins containing a 1-hour spin were collected under the conditions described in Example 6. For reference purposes, a bobbin collected under the same conditions as described in Comparative Example 1, which has not subjected to any equipment of the pre-recovery unit, was used. The mechanical properties were determined in accordance with ISO 2062 using an initial length of 250 mm and a displacement speed of the crossbar of 250 mm/min. An Instron pneumatic grip for textile specimens was used. Washing the bobbins with n-hexane, as well as the draw procedure, were carried out in accordance with patent document U.S. Pat. No. 8,003,027B2. Samples with draw ratios greater than 5.0 lack a good performance in the batch type extractor described in the cited patent document. From this draw ratio on, the yarns began to become too stiff, with yarns being wound in a too compact manner for n-hexane to be able to percolate in the yarn layer of the bobbin. To these samples, it was noted an evident preferred path between the bobbin yarns in the batch type extractor. As is known in the state of the art, mechanical properties get worse with the increase in the content of the first solvent in the xerogel yarn.

TABLE VI

| Experiment Name | Draw Rate | Tenacity (cN/dtex) |
|---|---|---|
| Bath Process | — | 38 |
| Continuous D.R. 1.1:1 | 1.1 | 38 |
| Continuous D.R. 2:1 | 2.0 | 36 |
| Continuous D.R. 3:1 | 3.0 | 38 |
| Continuous D.R. 5:1 | 5.0 | 34 |

Example 8: Performance Assessment of the Extractors in the Continuous Method Described by the Invention The same spinning formulation and condition as described in Comparative Example 1 was applied to assess the extraction unit. A spinneret containing 15 capillaries was used. The flow rate of the spinning pump was adjusted so as to achieve a mass flow rate of 0.45 g/min for each capillary. The filaments bundle passed through a 10 mm air gap and a water (quenching) bath at a temperature of 10° C. The yarn was then pulled by a spinning godet at a speed of 3.17 m/min and then fed to the pre-recovery unit. A small draw of 1.02 was applied in all the intermediate steps of the pre-recovery unit, with the exception of the draw in liquid medium and in the Accumulator, where a draw ratio of 1.2 was applied to the gel yarn. A continuous extractor containing four extraction units was used to wash the gel yarn. A guide yarn was used to prepare the extractor to receive the gel yarn thus produced. Such guide yarn was passed through the Feed Foulard of Extraction Unit 1 and was then wound onto four Rotary Drums of the four units. In each drum, a total of 14 turns were made. The drums are 600 mm in diameter and have an auxiliary roll of 60 mm. The distance between axes is of 600 mm. After passing the guide yarn, doors were closed, the units were inertized with nitrogen until the oxymeter showed an oxygen content of less than 0.1% (v/v). At this moment, the feed pump started loading the units with clean n-hexane. After loading, the machine was pressurized with nitrogen up to a work pressure of 0.4 bar and this condition was maintained throughout the test. Circulation pumps of units 1, 2, 3 and 4 were added and the Drums started pulling the gel yarn with the aid of the guide yarn. The contact time in each unit was of about 4 minutes at the test speed. Feed rate was maintained at 12 L/h. The gel yarn at the outlet of the extractors was fed to a yarn dryer from Mathis. The drying temperature was adjusted to 80° C. and the draw ratio between extractors and the dryer was adjusted to 1,02. The Barmag winding device was mounted on the outlet of the dryer to collect the xerogel yarn. Xerogel yarn samples were collected for assessing the residual oil by Soxhlet. The oil content in the circulation liquid was determined by an index of refraction using an calibration curve of oil in n-hexane. For increasing the accuracy of the method, three calibration curves were made in three ranges of oil in n-hexane content. The results are shown in Table VII.

TABLE VII

| | Values/ Extractor 1 | Values/ Extractor 2 | Values/ Extractor 3 | Values/ Extractor 4 |
|---|---|---|---|---|
| Input | | | | |
| Yarn Speed (m/min.) | 14.5 | 14.8 | 15.1 | 15.4 |
| Contact Time (min.) | 4 | 4 | 4 | 4 |
| Oil-In-Yarn Inlet (wt %) | 90 | * | * | * |
| Titre Yarn Inlet (dtex) | 3720 | * | * | * |
| Solvent Flow Rate (L/h) | 12.0 | 12.0 | 12.0 | 12.0 |
| Partition coefficient (—) | ~1 | ~1 | ~1 | ~1 |
| Extraction Temperature (° C.) | 35 | 35 | 35 | 35 |
| Output | | | | |
| Recirculation Phase Oil-In-Solvent (wt %) | 5.1 | 0.3 | 0.04 | <0.01 |
| Residual Oil-In-xerogel Yarn Outlet (wt %) | * | * | * | 0.06 |

* It wasn't determined

Example 9: Assessing the Performance of the Extractors in the Continuous Method Described by the Invention Using a Single Extraction Unit The present experiment was carried out as described in Example 8, but a spinneret of 34 filaments of 0.5 mm diameter was used. Only the circulation pump of the extraction unit 1 was turned on. Results are set forth in Table IX. The results are shown in Table VIII.

TABLE VIII

|  | Values/Extractor 1 |
| --- | --- |
| Input | |
| Yarn Speed (m/min.) | 14.5 |
| Contact Time (min.) | 4 |
| Oil-In-Yarn Inlet (wt %) | 90 |
| Titre Yarn Inlet (dtex) | 8,434 |
| Solvent Flow Rate (L/h) | 12.0 |
| Partition coefficient (—) | ~1 |
| Extraction Temperature (° C.) | 35 |
| Output | |
| Recirculation Phase Oil-In-Solvent (wt %) | 4.8 |
| Residual Oil-In-xerogel Yarn Outlet (wt %) | 22.8 |

Example 10: Assessing the Performance of the Extractors in the Continuous Method Described by the Invention Using Two Extraction Units The same experiment was made as described in Example 9, but the circulation pump of extraction unit 2 was also turned on. That is, the behavior in extraction with two units was studied. Results are set forth in Table IX.

TABLE IX

|  | Values/Extractor 1 | Values/Extractor 2 |
| --- | --- | --- |
| Input | | |
| Yarn Speed (m/min.) | 14.5 | 14.8 |
| Contact Time (min.) | 4 | 4 |
| Oil-In-Yarn Inlet (wt %) | 90 | * |
| Titre Yarn Inlet (dtex) | 8,434 | * |
| Solvent Flow Rate (L/h) | 12.0 | 12.0 |
| Partition coefficient (—) | ~1 | ~1 |
| Extraction Temperature (° C.) | 35 | 35 |
| Output | | |
| Recirculation Phase Oil-In-Solvent (wt %) | 4.8 | 0.39 |
| Residual Oil-In-xerogel Yarn Outlet (wt %) | * | 1.6 |

* It wasn't determined

Example 11: Assessing the Performance of the Extractors in the Continuous Method Described by the Invention Using Three Extraction Units The present Experiment was carried out as described in Example 9, but the circulation pump in extraction units 2 and 3 were also turned on. That is, the behavior in extraction with three units was studied. Results are set forth in Table X.

TABLE X

|  | Values/Extractor 1 | Values/Extractor 2 | Values/Extractor 3 |
| --- | --- | --- | --- |
| Input | | | |
| Yarn Speed (m/min.) | 14.5 | 14.8 | 15.1 |
| Contact Time (min) | 4 | 4 | 4 |
| Oil-In-Yarn Inlet (wt %) | 90 | * | * |
| Titre Yarn Inlet (dtex) | 8,434 | * | * |
| Solvent Flow Rate (L/h) | 12.0 | 12.0 | 12.0 |
| Partition coefficient (—) | ~1 | ~1 | ~1 |
| Extraction Temperature (° C.) | 35 | 35 | 35 |
| Output | | | |
| Recirculation Phase Oil-In-Solvent (wt %) | 4.8 | 0.39 | 0.08 |
| Residual Oil-In-xerogel Yarn Outlet (wt %) | * | * | 0.24 |

* It wasn't determined

Example 12: Assessing the Performance of the Extractors in the Continuous Method Described by the Invention Using Four Extraction Units To determine the index of clean n-hexane consumption to produce 1 kg of xerogel yarn, a bobbin containing 90 filaments of gel yarn was continually fed into the extraction unit. The Experiment was carried out by changing the feed flow rate of clean solvent in the fourth unit, such that it was possible to measure the residual oil content in the xerogel yarn as a function of the flow rate, awaiting for the stabilization time of the method. Data to the xerogel sample containing about 4% oil is set forth in Table XI.

TABLE XI

|  | Values/Extractor 1 | Values/Extractor 2 | Values/Extractor 3 | Values/Extractor 4 |
| --- | --- | --- | --- | --- |
| Input | | | | |
| Yarn Speed (m/min.) | 14.5 | 14.8 | 15.1 | 15.4 |
| Contact Time (min.) | 4 | 4 | 4 | 4 |
| Oil-In-Yarn Inlet (wt %) | 86 | * | * | * |
| Titre Yarn Inlet (dtex) | 57,410 | * | * | * |

TABLE XI-continued

|  | Values/ Extractor 1 | Values/ Extractor 2 | Values/ Extractor 3 | Values/ Extractor 4 |
|---|---|---|---|---|
| Solvent Flow Rate (L/h) | 15.0 | 15.0 | 15.0 | 15.0 |
| Partition coefficient (—) | ~1 | ~1 | ~1 | ~1 |
| Extraction Temperature (° C.) | 35 | 35 | 35 | 35 |
| Output | | | | |
| Recirculation Phase Oil-In-Solvent (wt %) | 31.8 | 9.96 | 2.96 | 0.72 |
| Residual Oil-In-xerogel Yarn Outlet (wt %) | * | * | * | 4.3 |
| Kg Solvent/Kg xerogel Yarn (—) | | | 14.9 | |

* It wasn't determined

Example 13: Assessment of the Product Produced by the Continuous Method Described by the Invention, where all the Steps are Used A xerogel yarn was produced under the same conditions as described in example 8. However, it was fed to a drawing machine comprising two towers containing five rolls, wherein a draw ratio of 1.2 at room temperature was applied. Thereafter, the yarn was heat drawn using a Retech drawing machine. A draw ratio of 6,4 was applied at the temperature of 135° C. to continually produce the POY yarn (Pre Oriented Yarn). A bobbin of POY yarn was then fed to a FET drawing machine, where the yarn was drawn in two steps between the temperatures of 145° C. and 150° C. A total draw ratio of 3.6 was applied to the yarn to obtain a final yarn. The mechanical properties were obtained in accordance with ISO 2062 using an initial length of 250 mm and a displacement speed of the crossbar of 250 mm/min. To determine the elastic modulus, a volumetric density of 970 kg/m3 was considered while calculating the cross section area of the filaments. An Instron pneumatic grip for textile specimens was used (Tenacity=38 cN/dtex, Tensile Modulus=132 GPa).

What is claimed is:

1. A dosing method of a mixture with a first solvent in a feeding zone of an extruder comprising the steps of inertizing the mixture with an inertization gas flow in an inertization device and feeding the extruder with a homogenized and inertized mixture at a temperature below 60° C., the method further comprising controlling the level of the mixture above an extruder screw and accumulating part of the homogenized and inertized mixture from at least one inertization device in a dosing device, prior to feeding the extruder with the mixture.

2. The dosing method of claim 1, further comprising the step of:

during start and stop steps of the extruder, feeding the extruder with a more diluted polymer mixture, wherein the more diluted mixture comprises a mass concentration lower than the mass concentration of the mixture used after the start step and prior to the stop step.

* * * * *